United States Patent [19]
Quirk et al.

[11] Patent Number: 5,675,617
[45] Date of Patent: Oct. 7, 1997

[54] SYNCHRONOUS PROTOCOL ENCODING AND DECODING METHOD

[75] Inventors: Patrick J. Quirk, Madison; John C. Richards, Union Grove, both of Ala.

[73] Assignee: Motorola, Inc., Schaumburg, Ill.

[21] Appl. No.: 317,669

[22] Filed: Oct. 5, 1994

[51] Int. Cl.$^6$ ........................................... H04L 7/00
[52] U.S. Cl. ........................... 375/365; 375/342; 375/366; 375/368; 375/369; 370/512; 370/513; 370/514; 364/715.09; 364/715.1
[58] Field of Search ........................ 375/242, 246, 375/253, 316, 340, 342, 354, 363–365, 368, 369; 370/60, 99, 102, 105.1, 111; 371/37.8; 341/59, 55, 67, 106; 364/715.09–715.11

[56] References Cited

U.S. PATENT DOCUMENTS 5,081,654  1/1992  Stephenson, Jr. et al. ............ 375/354
5,465,345  11/1995  Blanc et al. ....................... 395/200.15
5,517,533  5/1996  Szmauz et al. ..................... 375/354

*Primary Examiner*—Stephen Chin
*Assistant Examiner*—Amanda T. Le
*Attorney, Agent, or Firm*—Nancy R. Gamburd

[57] ABSTRACT

A method to encode and to decode frames of data used in synchronous protocols, including HDLC and SDLC. The invention operates on blocks of data, such as data bytes or data words, in a parallel rather than a bit serial manner. The invention compares an aligned block of data with reference bit sequences for flag or abort signal detection, for zero detection, for zero deletion, for detection of consecutive one bits, and for zero insertion following a stream of consecutive one bits, for encoding and decoding according to various protocols. The invention also maintains proper data alignment following such zero insertions or deletions, and provides encoding and decoding under both data overrun and data underrun conditions.

14 Claims, 19 Drawing Sheets

HDLC-BISYNC DETECTION REFERENCE TABLE
DESCRIPTION: THIS TABLE PROVIDES INFORMATION ABOUT THE RECEIVED
CHARACTER. IF IT IS THE BISYNC SYN CHAR OR THE HDLC FLAG,
STATUS BITS WILL BE SET TO GIVE THE SHIFT VALUE HDLC/BISYNC,
VALID/INVALID, AND ASCII/EBCDIC.

TABLE A

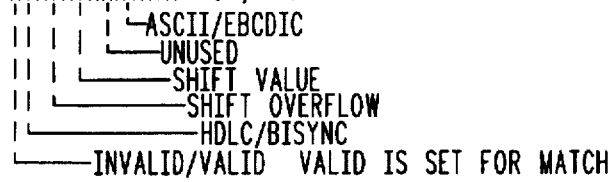

```
X|X|X|XXX|X|X  0 / 1
| | | |   | |  ASCII/EBCDIC
| | | |   | UNUSED
| | | |   SHIFT VALUE
| | | SHIFT OVERFLOW
| | HDLC/BISYNC
| INVALID/VALID   VALID IS SET FOR MATCH
```

HDLC_BISYNC_DET_TABLE:

| INPUT RANGE | RETURN VALUES | | | | | | | |
|---|---|---|---|---|---|---|---|---|
| 00-07 | 01CH | 000H | 000H | 000H | 000H | 000H | 000H | 000H |
| 08-0F | 000H | 000H | 000H | 000H | 05CH | 000H | 000H | 000H |
| 10-17 | 000H | 000H | 000H | 000H | 000H | 000H | 0C0H | 000H |
| 18-1F | 000H | 05DH | 000H | 000H | 000H | 000H | 000H | 000H |
| 20-27 | 051H | 000H | 000H | 051H | 000H | 000H | 000H | 000H |
| 28-2F | 000H | 000H | 000H | 000H | 044H | 044H | 000H | 051H |
| 30-37 | 000H | 000H | 0C1H | 000H | 000H | 000H | 000H | 000H |
| 38-3F | 000H | 000H | 000H | 000H | 000H | 000H | 000H | 01CH |
| 40-47 | 055H | 000H | 000H | 000H | 000H | 000H | 055H | 000H |
| 48-4F | 000H | 000H | 000H | 000H | 000H | 000H | 000H | 000H |
| 50-57 | 000H | 000H | 000H | 000H | 000H | 000H | 000H | 000H |
| 58-5F | 048H | 000H | 000H | 048H | 000H | 000H | 000H | 055H |
| 60-67 | 050H | 000H | 000H | 000H | 045H | 045H | 000H | 000H |
| 68-6F | 000H | 000H | 000H | 000H | 000H | 000H | 000H | 050H |
| 70-77 | 000H | 000H | 000H | 000H | 000H | 000H | 000H | 000H |
| 78-7F | 000H | 000H | 000H | 000H | 000H | 000H | 080H | 01CH |
| 80-87 | 018H | 000H | 000H | 000H | 000H | 058H | 000H | 000H |
| 88-8F | 000H | 000H | 000H | 000H | 059H | 000H | 000H | 000H |
| 90-97 | 04DH | 04DH | 000H | 000H | 000H | 000H | 000H | 04DH |
| 98-9F | 000H | 000H | 000H | 000H | 000H | 000H | 000H | 018H |
| A0-A7 | 000H | 000H | 000H | 000H | 000H | 000H | 000H | 000H |
| A8-AF | 000H | 000H | 000H | 000H | 000H | 000H | 000H | 000H |
| B0-B7 | 04CH | 000H | 000H | 000H | 000H | 000H | 000H | 04CH |
| B8-BF | 000H | 000H | 000H | 000H | 000H | 000H | 000H | 018H |
| C0-C7 | 014H | 000H | 054H | 000H | 000H | 000H | 000H | 000H |
| C8-CF | 049H | 000H | 000H | 049H | 000H | 000H | 000H | 014H |
| D0-D7 | 000H | 000H | 000H | 000H | 000H | 000H | 000H | 000H |
| D8-DF | 000H | 000H | 000H | 000H | 000H | 000H | 000H | 014H |
| E0-E7 | 010H | 000H | 000H | 000H | 000H | 000H | 000H | 010H |
| E8-EF | 000H | 000H | 000H | 000H | 000H | 000H | 000H | 010H |
| F0-07 | 00CH | 000H | 000H | 00CH | 000H | 000H | 000H | 00CH |
| F8-FF | 008H | 008H | 000H | 008H | 004H | 004H | 000H | 000H |

(END OF TABLE A)

*FIG.16*

TABLE B

HDLC RIGHT SHIFT AND INTRAOCTET ZERO DELETION REFERENCE TABLE
DESCRIPTION: THIS TABLE RETURNS THE RIGHT SHIFT-ZERO DELETED ADJUSTED
CHARACTER. IF VALUE IS THE SAME AS OFFSET, NO DELETION WAS NECESSARY.

HDLC_SHIFT_DEL_TABLE:

| INPUT RANGE | RETURN VALUES | | | | | | |
|---|---|---|---|---|---|---|---|
| 00-07 | 000H | 001H | 002H | 003H | 004H | 005H | 006H | 007H |
| 08-0F | 008H | 009H | 00AH | 00BH | 00CH | 00DH | 00EH | 00FH |
| 10-17 | 010H | 011H | 012H | 013H | 014H | 015H | 016H | 017H |
| 18-1F | 018H | 019H | 01AH | 01BH | 01CH | 01DH | 01EH | 09FH |
| 20-27 | 020H | 021H | 022H | 023H | 024H | 025H | 026H | 027H |
| 28-2F | 028H | 029H | 02AH | 02BH | 02CH | 02DH | 02EH | 02FH |
| 30-37 | 030H | 031H | 032H | 033H | 034H | 035H | 036H | 037H |
| 38-3F | 038H | 039H | 03AH | 03BH | 03CH | 03DH | 0BEH | 0BFH |
| 40-47 | 040H | 041H | 042H | 043H | 044H | 045H | 046H | 047H |
| 48-4F | 048H | 049H | 04AH | 04BH | 04CH | 04DH | 04EH | 04FH |
| 50-57 | 050H | 051H | 052H | 053H | 054H | 055H | 056H | 057H |
| 58-5F | 058H | 059H | 05AH | 05BH | 05CH | 05DH | 05EH | 05FH |
| 60-67 | 060H | 061H | 062H | 063H | 064H | 065H | 066H | 067H |
| 68-6F | 068H | 069H | 06AH | 06BH | 06CH | 06DH | 06EH | 06FH |
| 70-77 | 070H | 071H | 072H | 073H | 074H | 075H | 076H | 077H |
| 78-7F | 078H | 079H | 07AH | 07BH | 07CH | 07DH | 07EH | 07FH |
| 80-87 | 080H | 081H | 082H | 083H | 084H | 085H | 086H | 087H |
| 88-8F | 088H | 089H | 08AH | 08BH | 08CH | 08CH | 08EH | 08FH |
| 90-97 | 090H | 091H | 092H | 093H | 094H | 095H | 096H | 097H |
| 98-9F | 098H | 099H | 09AH | 09BH | 09CH | 09DH | 09EH | 09FH |
| A0-A7 | 0A0H | 0A1H | 0A2H | 0A3H | 0A4H | 0A5H | 0A6H | 0A7H |
| A8-AF | 0A8H | 0A9H | 0AAH | 0ABH | 0ACH | 0ADH | 0AEH | 0AFH |
| B0-B7 | 0B0H | 0B1H | 0B2H | 0B3H | 0B4H | 0B5H | 0B6H | 0B7H |
| B8-BF | 0B8H | 0B9H | 0BAH | 0BBH | 0BCH | 0BDH | 0BEH | 0BFH |
| C0-C7 | 0C0H | 0C1H | 0C2H | 0C3H | 0C4H | 0B5H | 0B6H | 0B7H |
| C8-CF | 0C8H | 0C9H | 0CAH | 0CBH | 0CCH | 0CDH | 0CEH | 0CFH |
| D0-D7 | 0D0H | 0D1H | 0D2H | 0D3H | 0D4H | 0D5H | 0D6H | 0D7H |
| D8-DF | 0D8H | 0D9H | 0DAH | 0DBH | 0DCH | 0DDH | 0DEH | 0DFH |
| E0-E7 | 0E0H | 0E1H | 0E2H | 0E3H | 0E4H | 0E5H | 0E6H | 0E7H |
| E8-EF | 0E8H | 0E9H | 0EAH | 0EBH | 0ECH | 0EDH | 0EEH | 0EFH |
| F0-07 | 0F0H | 0F1H | 0F2H | 0F3H | 0F4H | 0F5H | 0F6H | 0F7H |
| F8-FF | 0F8H | 0F9H | 0FAH | 0FBH | 0FCH | 0FDH | 0FEH | 0FFH |

(END OF TABLE B)

FIG.17

TABLE C

HDLC INTEROCTET ZERO DELETION MASK REFERENCE TABLE
DESCRIPTION: THIS TABLE RETURNS THE RIGHT SHIFT-ZERO DELETED BOUNDARY MASK. IF NEXT VALUE IS THE SAME INITIAL, PATTERN AS MASK, DELETE ZERO, AND SHIFT.

HDLC_ZERO_DEL_TABLE

| INPUT RANGE | RETURN VALUES | | | | | | | |
|---|---|---|---|---|---|---|---|---|
| 00-07 | 000H | 000H | 000H | 000H | 000H | 000H | 000H | 000H |
| 08-0F | 000H | 000H | 000H | 000H | 000H | 000H | 000H | 000H |
| 10-17 | 000H | 000H | 000H | 000H | 000H | 000H | 0C0H | 000H |
| 18-1F | 000H | 05DH | 000H | 000H | 000H | 000H | 000H | 000H |
| 20-27 | 000H | 000H | 000H | 000H | 000H | 000H | 000H | 000H |
| 28-2F | 000H | 000H | 000H | 000H | 000H | 000H | 000H | 000H |
| 30-37 | 000H | 000H | 000H | 000H | 000H | 000H | 000H | 000H |
| 38-3F | 000H | 000H | 000H | 000H | 000H | 000H | 000H | 000H |
| 40-47 | 000H | 000H | 000H | 000H | 000H | 000H | 000H | 000H |
| 48-4F | 000H | 000H | 000H | 000H | 000H | 000H | 000H | 000H |
| 50-57 | 000H | 000H | 000H | 000H | 000H | 000H | 000H | 000H |
| 58-5F | 000H | 000H | 000H | 000H | 000H | 000H | 000H | 000H |
| 60-67 | 000H | 000H | 000H | 000H | 000H | 000H | 000H | 000H |
| 68-6F | 000H | 000H | 000H | 000H | 000H | 000H | 000H | 000H |
| 70-77 | 000H | 000H | 000H | 000H | 000H | 000H | 000H | 000H |
| 78-7F | 000H | 000H | 000H | 000H | 000H | 000H | 000H | 000H |
| 80-87 | 010H | 010H | 010H | 010H | 010H | 010H | 010H | 010H |
| 88-8F | 010H | 010H | 010H | 010H | 010H | 010H | 010H | 010H |
| 90-97 | 010H | 010H | 010H | 010H | 010H | 010H | 010H | 010H |
| 98-9F | 010H | 010H | 010H | 010H | 010H | 010H | 010H | 010H |
| A0-A7 | 010H | 010H | 010H | 010H | 010H | 010H | 010H | 010H |
| A8-AF | 010H | 010H | 010H | 010H | 010H | 010H | 010H | 010H |
| B0-B7 | 010H | 010H | 010H | 010H | 010H | 010H | 010H | 010H |
| B8-BF | 010H | 010H | 010H | 010H | 010H | 010H | 010H | 010H |
| C0-C7 | 008H | 008H | 008H | 008H | 008H | 008H | 008H | 008H |
| C8-CF | 008H | 008H | 008H | 008H | 008H | 008H | 008H | 008H |
| D0-D7 | 008H | 008H | 008H | 008H | 08H | 008H | 008H | 008H |
| D8-DF | 008H | 008H | 008H | 008H | 008H | 008H | 008H | 008H |
| E0-E7 | 004H | 004H | 004H | 004H | 004H | 004H | 004H | 004H |
| E8-EF | 004H | 004H | 004H | 004H | 004H | 004H | 004H | 004H |
| F0-07 | 002H | 002H | 002H | 002H | 002H | 002H | 002H | 002H |
| F8-FF | 001H | 001H | 001H | 001H | 000H | 000H | 000H | 000H |

(END OF TABLE C)

FIG.18

TABLE D

HDLC LEFT SHIFT AND INTRAOCTET ZERO INSERTION REFERENCE TABLE

DESCRIPTION: THIS TABLE RETURNS THE LEFT SHIFT-ZERO INSERTED ADJUSTED CHARACTER. IF VALUE IS THE SAME AS OFFSET, NO INSERTION WAS NECESSARY.

HDLC_SHIFT_INS_TABLE

| INPUT RANGE | RETURN VALUES | | | | | | | |
|---|---|---|---|---|---|---|---|---|
| 00-07 | 000H | 001H | 002H | 003H | 004H | 005H | 006H | 007H |
| 08-0F | 008H | 009H | 00AH | 00BH | 00CH | 00DH | 00EH | 00FH |
| 10-17 | 010H | 011H | 012H | 013H | 014H | 015H | 016H | 017H |
| 18-1F | 018H | 019H | 01AH | 01BH | 01CH | 01DH | 01EH | 0E04 |
| 20-27 | 020H | 021H | 022H | 023H | 024H | 025H | 026H | 027H |
| 28-2F | 028H | 029H | 02AH | 02BH | 02CH | 02DH | 02EH | 02FH |
| 30-37 | 030H | 031H | 032H | 033H | 034H | 035H | 036H | 037H |
| 38-3F | 038H | 039H | 03AH | 03BH | 03CH | 03DH | 0C1H | 0A0H |
| 40-47 | 040H | 041H | 042H | 043H | 044H | 045H | 046H | 047H |
| 48-4F | 048H | 049H | 04AH | 04BH | 04CH | 04DH | 04EH | 04FH |
| 50-57 | 050H | 051H | 052H | 053H | 054H | 055H | 056H | 057H |
| 58-5F | 058H | 059H | 05AH | 05BH | 05CH | 05DH | 05EH | 060H |
| 60-67 | 060H | 061H | 062H | 063H | 064H | 065H | 066H | 067H |
| 68-6F | 068H | 069H | 06AH | 06BH | 06CH | 06DH | 06EH | 06FH |
| 70-77 | 070H | 071H | 072H | 073H | 074H | 075H | 076H | 077H |
| 78-7F | 078H | 079H | 07AH | 07BH | 083H | 082H | 041H | 020H |
| 80-87 | 080H | 081H | 082H | 083H | 084H | 085H | 086H | 087H |
| 88-8F | 088H | 089H | 08AH | 08BH | 08CH | 08DH | 08EH | 08FH |
| 90-97 | 090H | 091H | 092H | 093H | 094H | 095H | 096H | 097H |
| 98-9F | 098H | 099H | 09AH | 09BH | 09CH | 09DH | 09EH | 09FH |
| A0-A7 | 0A0H | 0A1H | 0A2H | 0A3H | 0A4H | 0A5H | 0A6H | 0A7H |
| A8-AF | 0A8H | 0A9H | 0AAH | 0ABH | 0ACH | 0ADH | 0AEH | 0AFH |
| B0-B7 | 0B0H | 0B1H | 0B2H | 0B3H | 0B4H | 0B5H | 0B6H | 0B7H |
| B8-BF | 0B8H | 0B9H | 0BAH | 0BBH | 0BCH | 0BDH | 0C1H | 0A0H |
| C0-C7 | 0C0H | 0C1H | 0C2H | 0C3H | 0C4H | 0B5H | 0B6H | 0B7H |
| C8-CF | 0C8H | 0C9H | 0CAH | 0CBH | 0CCH | 0CDH | 0CEH | 0CFH |
| D0-D7 | 0D0H | 0D1H | 0D2H | 0D3H | 0D4H | 0D5H | 0D6H | 0D7H |
| D8-DF | 0D8H | 0D9H | 0DAH | 0DBH | 0DCH | 0DDH | 0DEH | 0DFH |
| E0-E7 | 0E0H | 0E1H | 0E2H | 0E3H | 0E4H | 0E5H | 0E6H | 0E7H |
| E8-EF | 0E8H | 0E9H | 0EAH | 0EBH | 0ECH | 0EDH | 0EEH | 0EFH |
| F0-07 | 0F0H | 0F1H | 0F2H | 0F3H | 0F4H | 0F5H | 0F6H | 0F7H |
| F8-FF | 0F8H | 0F9H | 0FAH | 0FBH | 083H | 082H | 041H | 020H |

(END OF TABLE D)

*FIG.19*

TABLE E

HDLC INTEROCTET ZERO INSERTION REFERENCE TABLE
DESCRIPTION: THIS TABLE RETURNS THE LEFT SHIFT-ZERO INSERTED BOUNDRY MASK. IF NEXT VALUE IS THE SAME INITIAL, PATTERN AS MASK, INSERT ZERO, AND SHIFT.

HDLC_ZERO_INS_TABLE:

| INPUT RANGE | RETURN VALUES | | | | | | | |
|---|---|---|---|---|---|---|---|---|
| 00-07 | 0FFH | 0FFH | 0FFH | 0FFH | 0FFH | 0FFH | 0FFH | 0FFH |
| 08-0F | 0FFH | 0FFH | 0FFH | 0FFH | 0FFH | 0FFH | 0FFH | 0FFH |
| 10-17 | 0FFH | 0FFH | 0FFH | 0FFH | 0FFH | 0FFH | 0FFH | 0FFH |
| 18-1F | 0FFH | 0FFH | 0FFH | 0FFH | 0FFH | 0FFH | 0FFH | 0FFH |
| 20-27 | 0FFH | 0FFH | 0FFH | 0FFH | 0FFH | 0FFH | 0FFH | 0FFH |
| 28-2F | 0FFH | 0FFH | 0FFH | 0FFH | 0FFH | 0FFH | 0FFH | 0FFH |
| 30-37 | 0FFH | 0FFH | 0FFH | 0FFH | 0FFH | 0FFH | 0FFH | 0FFH |
| 38-3F | 0FFH | 0FFH | 0FFH | 0FFH | 0FFH | 0FFH | 0FFH | 0FFH |
| 40-47 | 0FFH | 0FFH | 0FFH | 0FFH | 0FFH | 0FFH | 0FFH | 0FFH |
| 48-4F | 0FFH | 0FFH | 0FFH | 0FFH | 0FFH | 0FFH | 0FFH | 0FFH |
| 50-57 | 0FFH | 0FFH | 0FFH | 0FFH | 0FFH | 0FFH | 0FFH | 0FFH |
| 58-5F | 0FFH | 0FFH | 0FFH | 0FFH | 0FFH | 0FFH | 0FFH | 0FFH |
| 60-67 | 0FFH | 0FFH | 0FFH | 0FFH | 0FFH | 0FFH | 0FFH | 0FFH |
| 68-6F | 0FFH | 0FFH | 0FFH | 0FFH | 0FFH | 0FFH | 0FFH | 0FFH |
| 70-77 | 0FFH | 0FFH | 0FFH | 0FFH | 0FFH | 0FFH | 0FFH | 0FFH |
| 78-7F | 00FH | 00FH | 00FH | 00FH | 00FH | 00FH | 00FH | 00FH |
| 80-87 | 00FH | 00FH | 00FH | 00FH | 00FH | 00FH | 00FH | 00FH |
| 88-8F | 00FH | 00FH | 00FH | 00FH | 00FH | 00FH | 00FH | 00FH |
| 90-97 | 00FH | 00FH | 00FH | 00FH | 00FH | 00FH | 00FH | 00FH |
| 98-9F | 00FH | 00FH | 00FH | 00FH | 00FH | 00FH | 00FH | 00FH |
| A0-A7 | 00FH | 00FH | 00FH | 00FH | 00FH | 00FH | 00FH | 00FH |
| A8-AF | 00FH | 00FH | 00FH | 00FH | 00FH | 00FH | 00FH | 00FH |
| B0-B7 | 00FH | 00FH | 00FH | 00FH | 00FH | 00FH | 00FH | 00FH |
| B8-BF | 00FH | 00FH | 00FH | 00FH | 00FH | 00FH | 00FH | 00FH |
| C0-C7 | 007H | 007H | 007H | 007H | 007H | 007H | 007H | 007H |
| C8-CF | 007H | 007H | 007H | 007H | 007H | 007H | 007H | 007H |
| D0-D7 | 007H | 007H | 007H | 007H | 007H | 007H | 007H | 007H |
| D8-DF | 007H | 007H | 007H | 007H | 007H | 007H | 007H | 007H |
| E0-E7 | 003H | 003H | 003H | 003H | 003H | 003H | 003H | 003H |
| E8-EF | 003H | 003H | 003H | 003H | 003H | 003H | 003H | 003H |
| F0-07 | 001H | 001H | 001H | 001H | 001H | 001H | 001H | 001H |
| F8-FF | 000H | 000H | 000H | 000H | 0FFH | 0FFH | 0FFH | 0FFH |

(END OF TABLE E)

FIG.20

SYNCHRONOUS PROTOCOL ENCODING AND DECODING METHOD

FIELD OF THE INVENTION

This application relates to synchronous protocols including, but not limited to, a High-Level Data Link Control protocol encoding and decoding method.

BACKGROUND OF THE INVENTION

Synchronous protocols are widely used in data transmission and reception. Protocols such as High-Level Data Link Control ("HDLC") and Synchronous Data Link Control ("SDLC") are used to synchronize such transmission and reception to, among other things, transmit data accurately. Typically, in a protocol such as HDLC, a particular signal known as a "flag", having a predetermined binary sequence such as 01111110 ("7E"), is transmitted at both the beginning and the end of a data bit stream and indicates that the data is in between the flags. Other signals may also be transmitted with such protocols, such as an "abort" signal, which may have a predetermined binary sequence such as 01111111 ("7F"). Bit-oriented protocols such as HDLC and SDLC are well-known in the communications field and are described in many sources, such as in A. Tanenbaum, *Computer Networks*, Section 4.7 (2d Ed. 1989, Prentice-Hall, Inc., Englewood Cliffs, N.J.); and in W. Stallings, *Data and Computer Communications*, pp. 142–52 (Macmillan Publishing Co., 1985).

Synchronous protocols such as HDLC and SDLC should include a methodology to distinguish such predetermined or otherwise specific signals from possible combinations or sequences of data. For example, there is a probability that a particular data stream could have a sequence such as 01111110, which could create confusion with a flag sequence. HDLC is a widely used synchronous protocol designed to avoid such confusion of data with predetermined signals such as a flag signal (having six consecutive one bits (1s)) or an abort signal (having seven consecutive one bits (1s)). In the data bit stream, HDLC involves the insertion of a zero bit after five consecutive one bits ("zero insertion") in the transmission of the data stream, to prevent six or seven consecutive one bits from appearing in the data. Upon reception of the data stream, the HDLC protocol also deletes the inserted zero ("zero deletion") to restore the data to its original form.

Such HDLC processing, at a minimum, involves the detection of five consecutive one bits and subsequent insertion or deletion of a zero bit. The conventional process for HDLC zero insertion and deletion, implemented in hardware or software, is to process the data in a serial manner, one bit at a time. When a data byte, usually an octet (eight bits) in length, is to be transmitted, it is first converted to a serial data stream via a shift register. This serial data stream is then monitored on a bit basis for consecutive ones. Consecutive one bits in the serial data stream are counted until a threshold of five is reached and then a zero is inserted into the data bit stream after the fifth consecutive one bit and before the next data bit. This data stream containing the inserted zero is then transmitted.

Correspondingly, the data stream containing the inserted zero is received by the user. For accurate data reception, when a zero inserted data stream is received, the inserted zero should be deleted. Conventional decoding processes use the same basic serial process of counting consecutive one bits in the data stream, but instead of inserting a zero following the fifth consecutive one, the received zero is deleted. The zero deleted data stream is then converted back into a data byte or word by loading the serial data stream into a shift register.

This HDLC zero insertion/deletion process is usually performed in hardware with a serial protocol integrated circuit ("IC") which implements the required shift registers, counters, and other functions. Discrete IC implementations for the required functions can also be used in hardware. Software solutions typically consist of processor microcode or instructions that simulate the same basic functions of the shift registers, counters, etc. of the serial hardware solutions.

Such conventional solutions have various shortcomings. The various hardware solutions using a serial protocol IC are expensive, and require additional board area to accommodate the additional IC. Discrete IC hardware solutions, while possibly cheaper in parts cost, may not be as flexible as a serial protocol IC and may also require significant board area for all of the individual ICs. Such additional hardware may not be feasible with the weight, space and volume limitations of many applications, such as in modems for notebook computers.

The various conventional software solutions, by simulating the basic hardware functions and operating on the data one bit at a time, also have shortcomings. Typical software implementations require a processor with significant processing bandwidth to execute the zero insertion and deletion methodologies at the high data rates common in today's communications equipment. Such processing architecture having such significant bandwidth requirements also may not be available in many desired applications.

With the advent of increasing rates of data transmission and reception, there is a growing need for such synchronous protocols to process such data streams at increasingly faster rates. To achieve faster rates of data transmission, there is a growing need to process HDLC, SDLC, or other synchronous protocols on a byte or word basis, 8 or 16 bits at a time, rather than use the conventional methods of processing the data stream on a serial bit basis. There is also a need to implement such faster data processing using conventional microprocessors having limited bandwidth.

TABLE A is an HDLC/BISYNC detection reference table.

TABLE B is an HDLC right shift and intraoctet zero deletion reference table.

TABLE C is an HDLC interoctet zero deletion mask reference table.

TABLE D is an HDLC left shift and intraoctet zero insertion reference table.

TABLE E is an HDLC interoctet zero insertion reference table.

DESCRIPTION OF THE PREFERRED EMBODIMENT

The present invention relates to a method to process synchronous protocols such as HDLC and SDLC on a block of data, such as a byte or word, rather than on a serial or bit basis. As explained in detail below, in various embodiments, the invention performs the flag or abort signal detection, the consecutive one bits detection, the zero detection, the zero deletion, and the zero insertion processes on a data byte or word basis, using data alignment procedures and software (or hardware) reference (or "lookup") tables. Also as explained in detail below, in various embodiments, the zero deletion and zero insertion processes may be performed on a data stream which also crosses a byte or word boundary, in addition to zero deletion and zero insertion within a data byte or data word.

The present invention has been implemented using the Intel 8031 microprocessor, a medium bandwidth microprocessor. As disclosed herein, the present invention has provided approximately a three-fold increase in the speed of decoding and encoding data over previous HDLC protocol methods.

As used herein, a block of data or a block may refer to any grouping of digital information or other data comprising more than one bit, such as six bits, a byte (eight bits), a word (sixteen bits), or a longword (thirty-two bits), and all of these various terms are used interchangeably. While the preferred embodiment of the invention performs encoding and decoding upon data bytes, the methods disclosed herein may be generalized and modified by those skilled in the art to operate on larger or smaller blocks of data.

Figure 1:
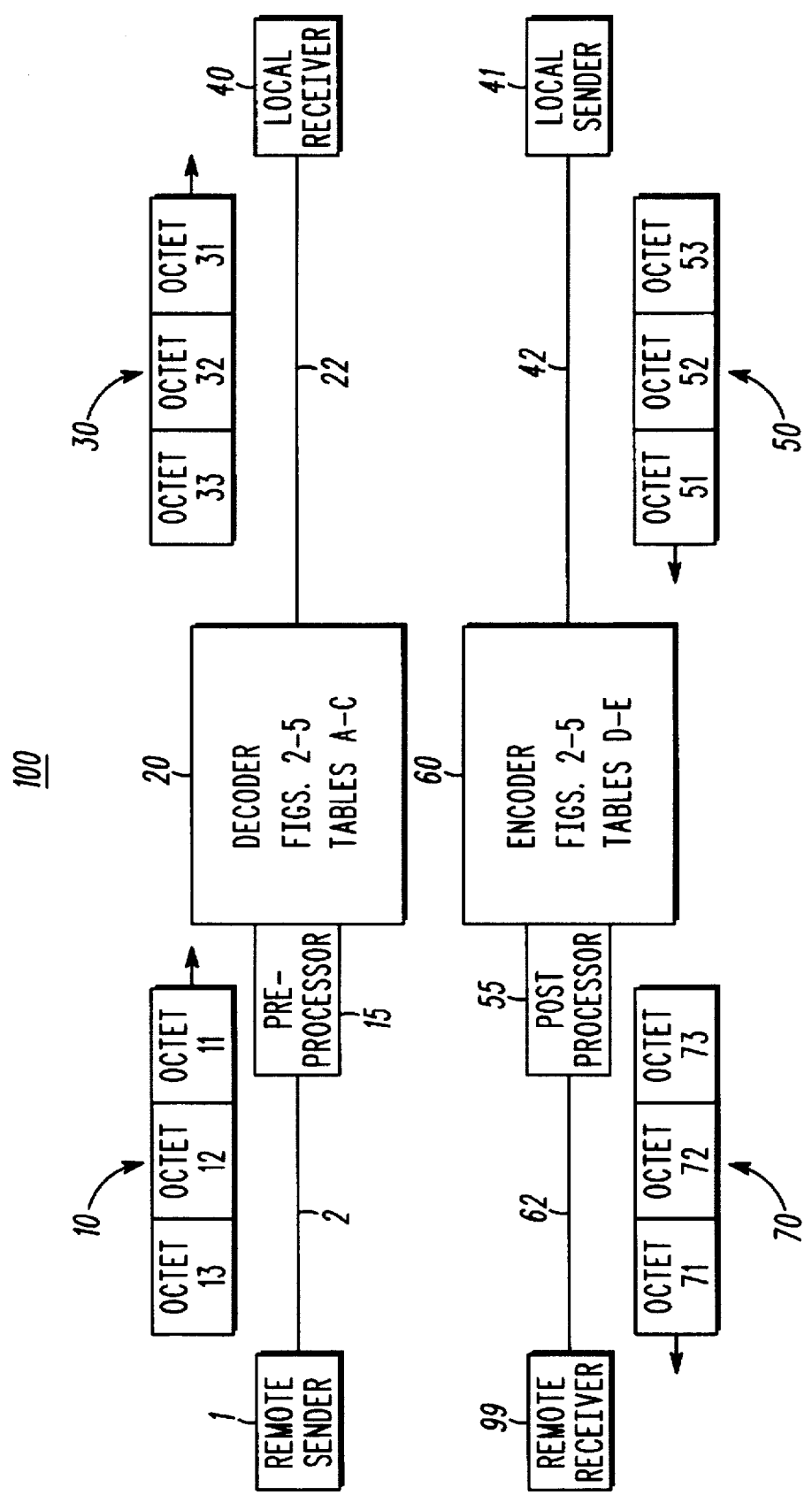
FIG. 1 is a block diagram showing a communication system 100 including a synchronous protocol decoder 20, a synchronous protocol encoder 60, flag detection and data alignment preprocessor 15, flag insertion postprocessor 55, the decoder, encoder, preprocessor, and postprocessor being arranged in accordance with the present invention.

Referring to FIG. 1, there is shown a communication system 100 including a remote sender 1 arranged to send HDLC-encoded data 10 to an HDLC protocol preprocessor 15 and decoder 20 by means of a first channel 2. As shown, the encoded data 10 comprises a serial data stream including a first octet 11, a second octet 12, and a third octet 13.

The preprocessor 15 is arranged to detect flags and align incoming data octets, for subsequent decoding of the data. As discussed in detail below, the flag detection and data alignment preprocessor 15 is characterized by the block diagram of FIG. 12, the flow diagram of FIG. 13, and TABLE A.

The decoder 20, in turn, is arranged to decode the aligned incoming encoded data, and to send the resulting decoded data 30 to a local receiver 40 by means of a second channel 22. As shown, the decoded data 30 comprises a parallel (or serial) data stream including a first octet 31, a second octet 32, and a third octet 33. As discussed in detail below, the decoder 20 is characterized by the various hardware diagrams, flow diagrams, and state diagrams disclosed herein, and also by TABLES B and C.

Still referring to FIG. 1, the communication system 100 further includes a local sender 41 arranged to send raw (uncoded) data 50 to an encoder 60 by means of a third channel 42. As shown, the uncoded data 50 comprises a parallel (or serial) data stream including a first octet 51, a second octet 52, and a third octet 53.

As will be more fully explained below, the encoder 60, in turn, is arranged to encode the incoming uncoded data 50. From the encoder 60, upon exhaustion of the incoming uncoded data or upon reaching frame capacity, the encoded data is transmitted to an HDLC postprocessor for insertion of a flag sequence at the beginning and at the end of the encoded data stream. The resulting frame of HDLC-encoded data 70 is sent to a remote receiver 99 by means of a fourth channel 62. As shown, the encoded frame of data 70 comprises a serial data stream including a first octet 71, a second octet 72, and a third octet 73. As discussed in detail below, the encoder 60 is characterized by the various hardware diagrams, flow diagrams, and state diagrams disclosed herein, and also by TABLES D and E.

Figure 4:
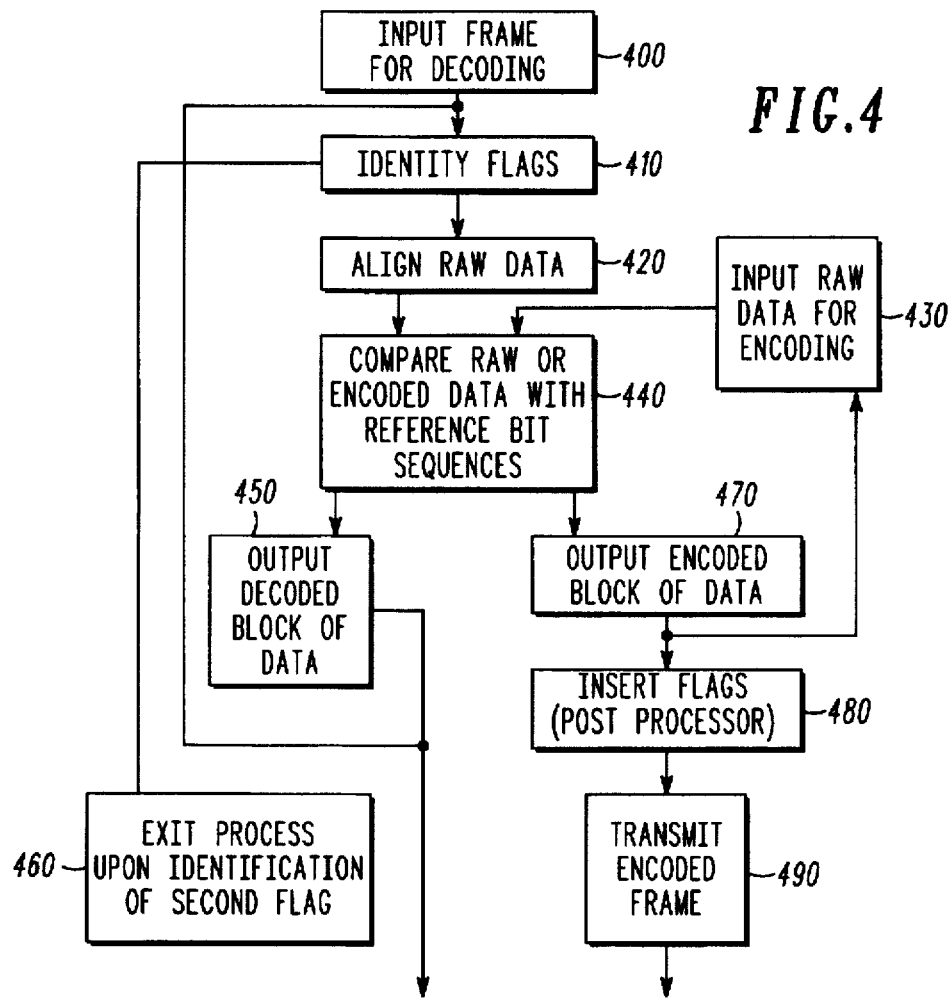
FIG. 4 is a top-level flow diagram for the flag detection, data alignment, encoding and decoding processes of the present invention.
Figure 12:
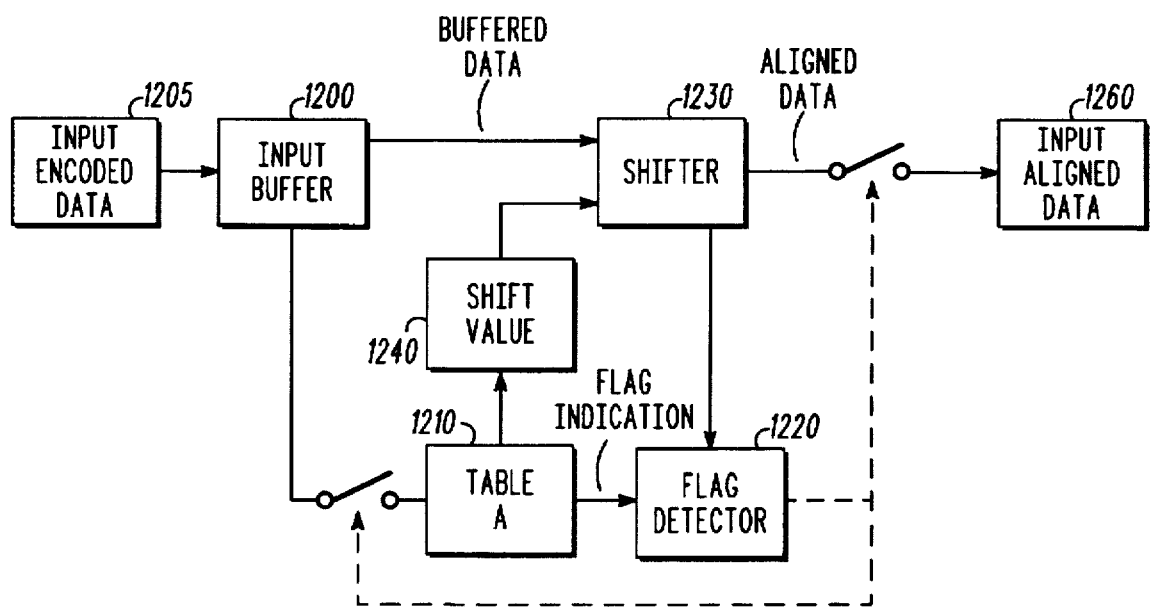
FIG. 12 is a block diagram showing an HDLC protocol flag detection and data alignment preprocessor, the preprocessor being arranged in accordance with the present invention.
Figure 13:
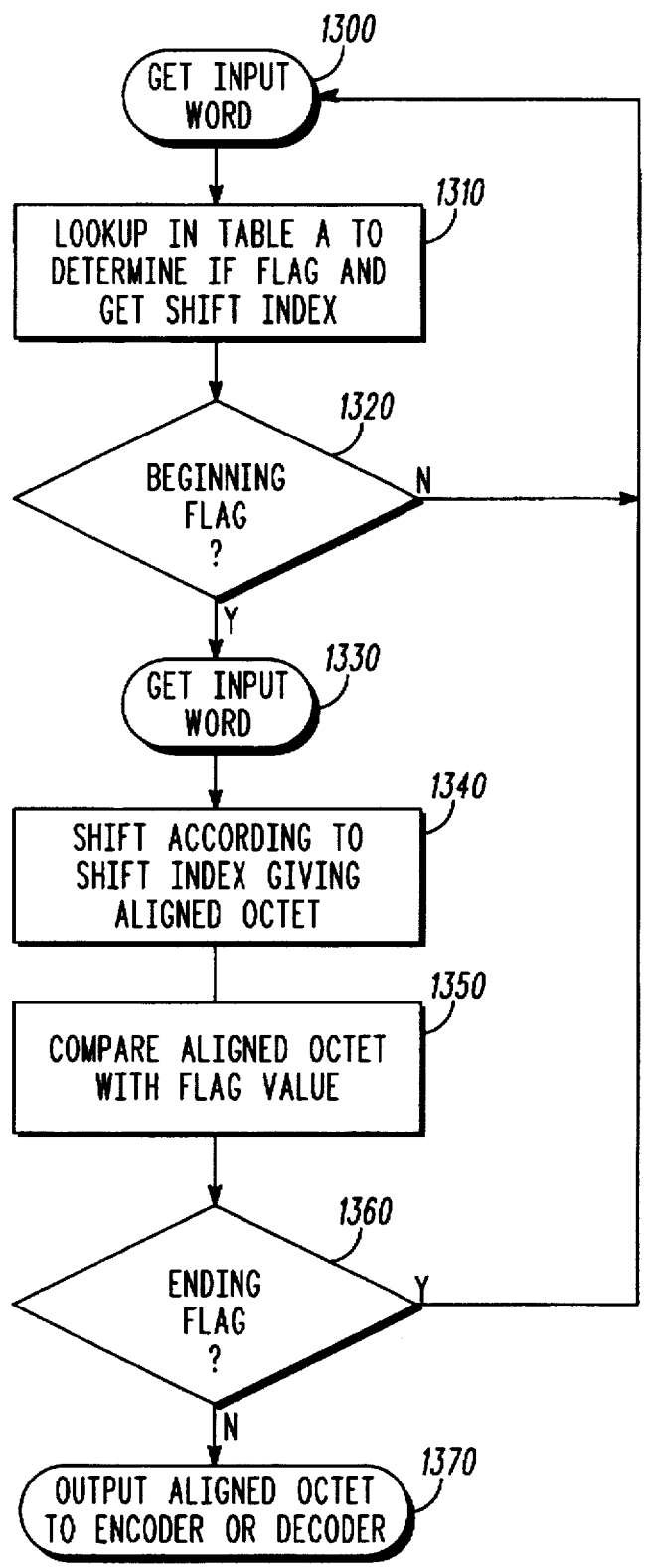
FIG. 13 is a flow diagram for the flag detection and data alignment processes for HDLC decoding in accordance with the present invention.

As explained in more detail below, the present invention performs HDLC zero insertion and deletion upon blocks of data, such as a byte or word, rather than on a serial basis, bit by bit. For decoding of a received frame or block of data, as shown in FIG. 4, the invention first determines whether a flag is present, using the preprocessor of FIGS. 12 and 13. Referring to FIGS. 12 and 13, for such flag detection, the invention compares the block of data to the reference bit sequences contained in TABLE A, the HDLC/BISYNC detection reference table. TABLE A contains (or otherwise stores or holds in memory) reference bit sequences (bit fields) that indicate possible flag detection, and information concerning how many bit shifts would be necessary for the block of data to be an exact flag. The block of data is shifted by the necessary amount (indicated by the bit shift information) and compared to the flag value. If the block of data matches the flag value, according to various protocols, subsequent bits following the flag constitute data. Given this identification or recognition of the flag location, the data may be properly aligned for the protocol, and the process proceeds to decode the subsequent blocks of data.

Upon such flag detection, the present invention uses a shift index to determine the appropriate number of bits necessary to be shifted to obtain proper data alignment. For example, analysis of an octet may indicate that a shift of three bits to the right (or, equivalently, five bits to the left) is necessary to obtain an exact flag. Analysis of subsequent octets, then, should also proceed with such a 3 bit right shift (or 5 bit left shift) to maintain proper data alignment. The preferred embodiment of the present invention provides such a shift index through a modulo 8 counter.

Figure 2:
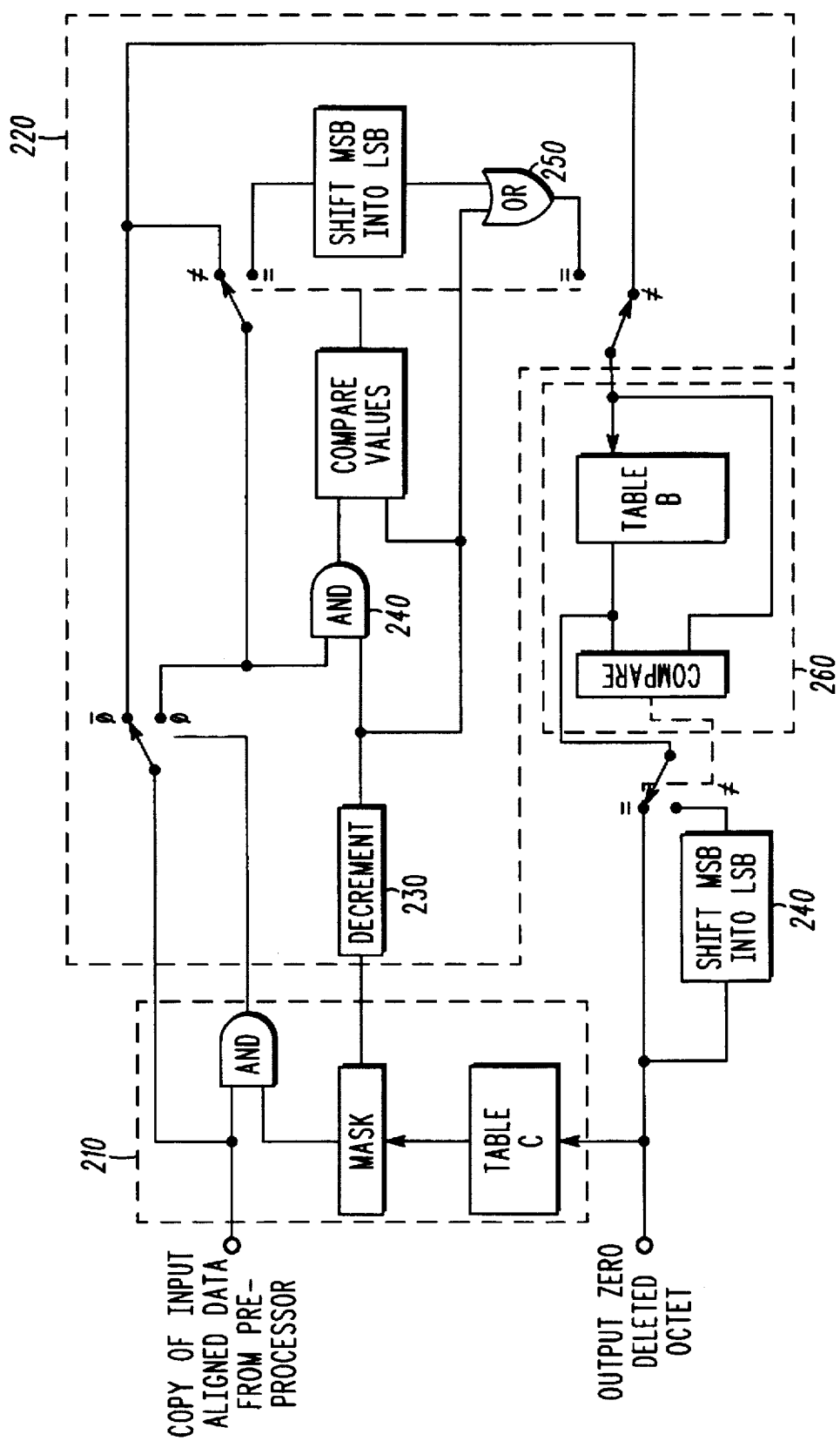
FIG. 2 is a block diagram showing an HDLC protocol decoder 20 arranged in accordance with the present invention.
Figure 8:
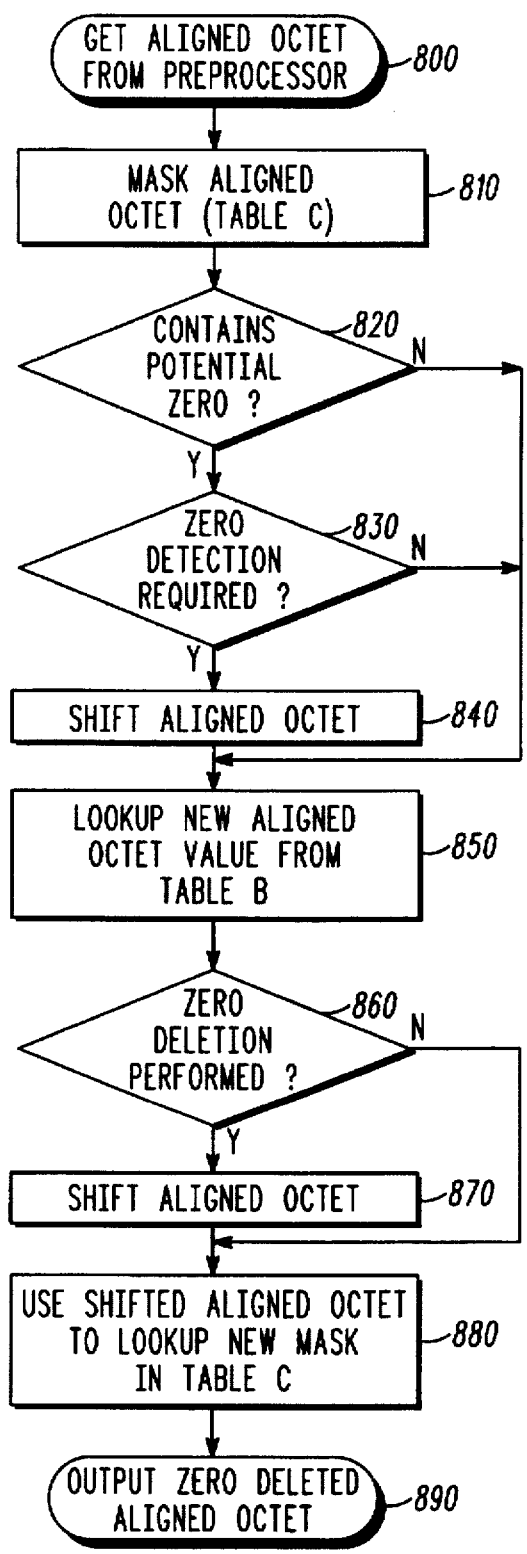
FIG. 8 is a flow diagram for the synchronous protocol decode process, the decoder being arranged in accordance with the present invention.

Once the data is properly aligned, the invention then determines whether a zero should be deleted from the data (when the invention is operating to decode and receive data) (FIGS. 2 and 8). In decoding data, the invention compares the block of data to the reference bit sequences contained in TABLE C to determine whether the block of data from the data stream requires a zero deletion in between byte or word boundaries (interoctet deletion), and further compares the block of data to the reference bit sequences contained in TABLE B to determine whether zero deletion is required within a data byte or word (intraoctet deletion). If a zero is deleted, corresponding bits are shifted to replace the deleted zero, and the shift index is updated to maintain proper data alignment. This decoding process is shown in flow diagrams, FIGS. 4 and 8, and implemented in a hardware block diagram, FIG. 2.

Figure 3:
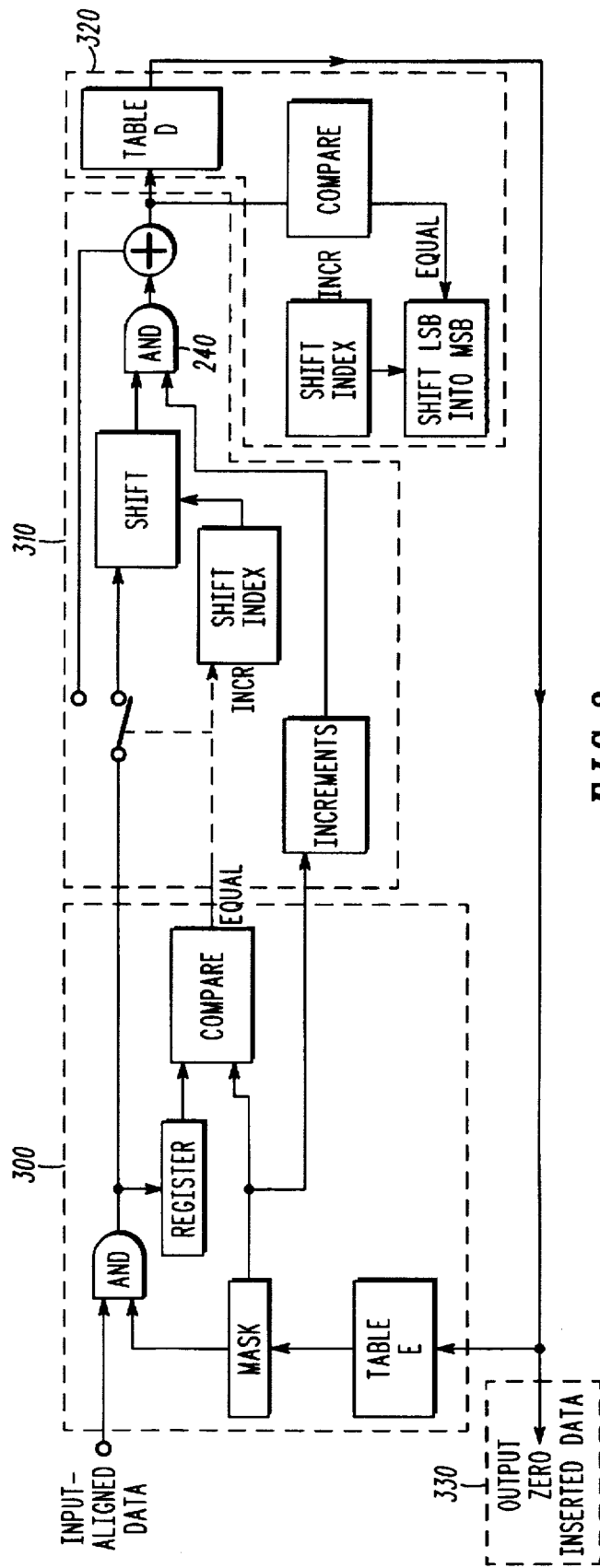
FIG. 3 is a block diagram showing an HDLC protocol encoder 60 arranged in accordance with the present invention.
Figure 9:
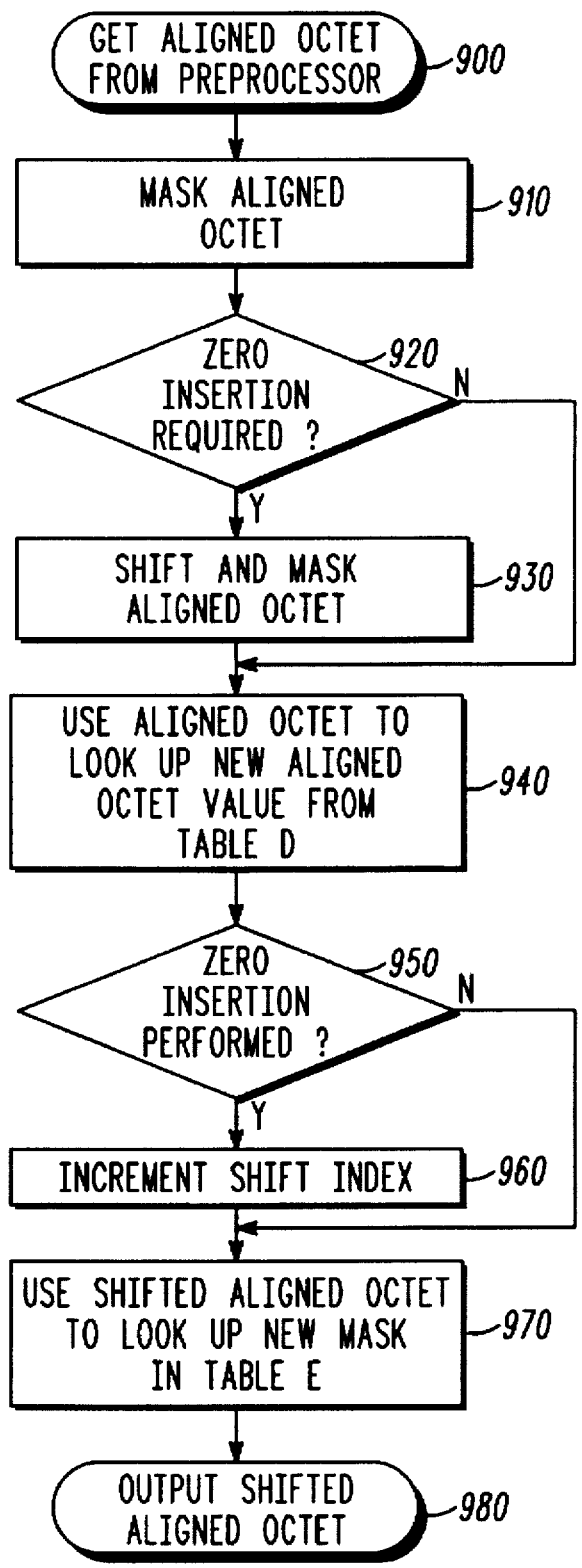
FIG. 9 is a flow diagram for the synchronous protocol encode process, the encoder being arranged in accordance with the present invention.

Correspondingly, the invention determines whether a zero should be inserted into the data (when the invention is operating to encode and send or transmit data) (FIGS. 3 and 9). Because the raw data for transmission is known to be raw data (rather than some other signal) and is therefore properly aligned, the flag detection and data alignment preprocessing is not necessary. For encoding the block of data, the invention compares the block of data to the reference bit sequences contained in TABLES D and E to encode data for transmission. The reference bit sequences contained in TABLE D are employed for zero insertion within a byte or word, and the reference bit sequences contained in TABLE E are employed for zero insertion between boundaries of adjacent bytes or words. This encoding process is shown in a flow diagrams FIGS. 4 and 9, and implemented in a hardware block diagram, FIG. 3.

It should be understood by those skilled in the art that the reference bit sequences utilized in this invention may exist, may be stored or otherwise may be contained in many forms, including in electromagnetic storage media, and may be organized in a limitless variety of formats. These reference bit sequences are presented herein in a tabular format, namely, TABLES A–E, as a matter of convenience only, and the invention should not be construed to be limited, in any way, by the method of organization, format, or storage of the reference bit sequences.

Also as explained in more detail below, the preferred embodiment of the invention also checks for data underrun and overrun conditions. When acting as a receiver and decoder, if a data underrun has occurred, the process is aborted and resumes upon receipt or shifting of another byte or word. Correspondingly, when acting as an encoder and transmitter, the process checks for a data overrun and continues encoding and transmitting until the data is exhausted.

Referring to FIG. 4, there is shown a top level block diagram of the encoding, decoding, flag detection and data alignment inventions. Upon receipt of an input frame for decoding 400, the process transitions to identify the presence of a flag, state 410, and aligns the encoded data, state 420. The invention compares the aligned encoded data with the reference bit sequences, state 440, and outputs a decoded block of data, state 450. This process repeats (or iterates) until another flag is identified, indicating the end of the frame of data, and the process is terminated, state 460.

Figure 14:
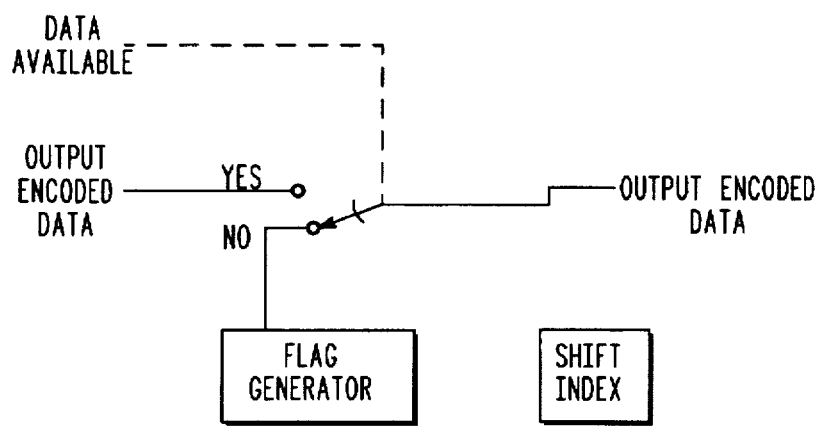
FIG. 14 is a block diagram for the flag insertion process for transmission of a frame of HDLC-encoded data in accordance with the present invention.

Also referring to FIG. 4, upon receipt of raw data for encoding, state 430, the process transitions to state 440 for comparison of the raw data with the reference bit sequences, and outputs an encoded block of data, state 470. The process repeats (or iterates) until the supply of raw data is exhausted or until the frame is full. The postprocessor (shown in FIG. 14) then inserts a flag sequence at the beginning and at the end of the block of data to create a frame, state 480, which may then be transmitted, state 490.

Figure 5:
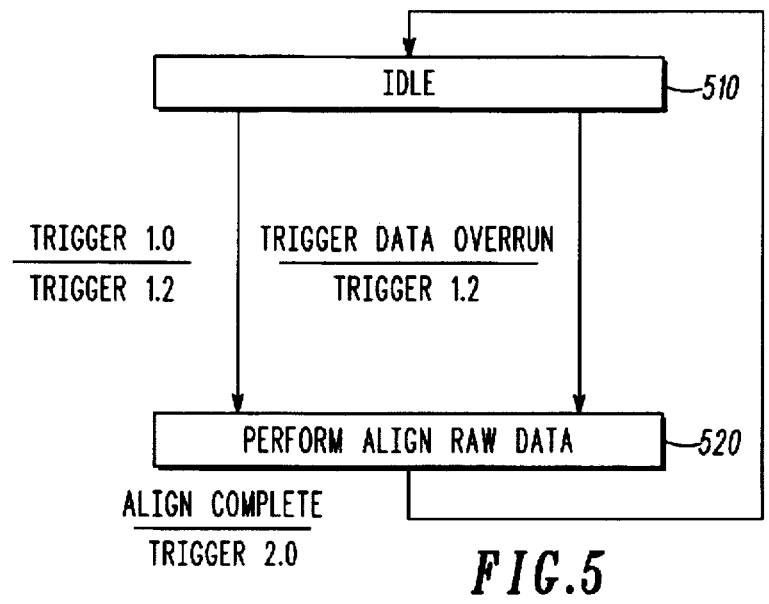
FIG. 5 is a state diagram for the preprocessor of FIG. 12, the state diagram including an idle state and an align raw data state.

Referring to FIG. 5, there is shown a state diagram for control of the alignment process for either coded or raw data. From the idle state 510, the entry of new data or a data overrun causes a transition to the perform align data state 520. When the alignment is complete, the system transitions to the idle state 510.

Figure 6:
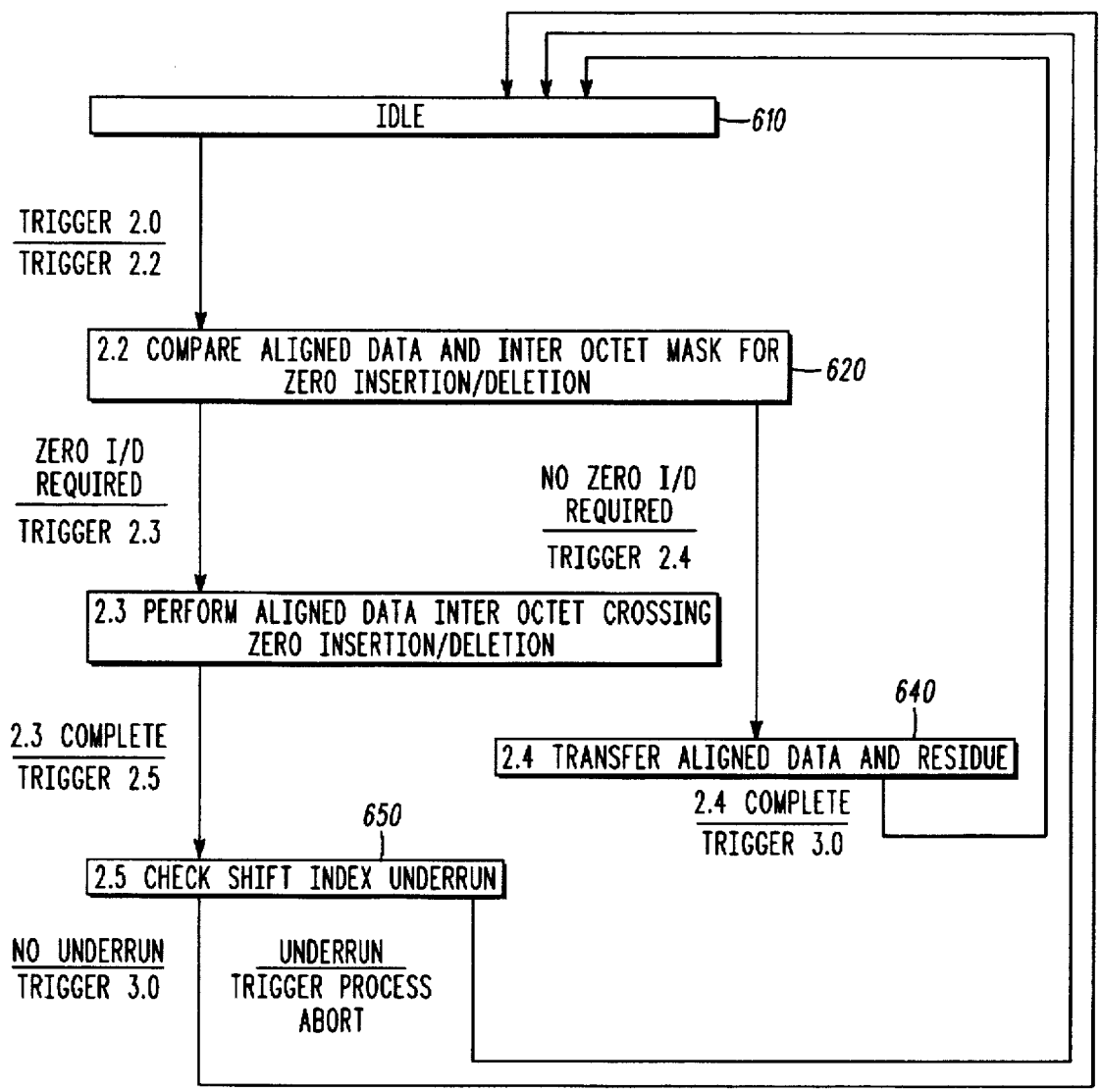
FIG. 6 is a state diagram for zero insertion and deletion relating to boundary crossings between blocks of aligned data.

Referring to FIG. 6, there is shown a state diagram for control of the zero insertion and deletion processes for the aligned data at octet boundary crossings (interoctet), between blocks of data. Beginning with the idle state 610, the completion of the alignment of the encoded data or the entry of raw data triggers the state 620 for comparison of the aligned or raw data with the reference bit sequences (or interoctet masks) for zero insertion or deletion. If a zero insertion or deletion is required, the state 620 transitions to state 630 for performance of the aligned data interoctet zero insertion/deletion. If no zero insertion or deletion is required, state 620 transitions to state 640, for transfer of the aligned data and residue (adjacent bits available for shifting into deleted bit positions). State 640 then transitions to the idle state 610. From the perform align data interoctet zero insertion/deletion state 630, once this process is complete, the state transitions to check the shift index underrun state 650. If no underrun has occurred, state 650 transitions to the idle state 610. If an underrun has occurred, the process abort is triggered, and the process waits or idles until another block of data is shifted or received for processing.

Figure 7:
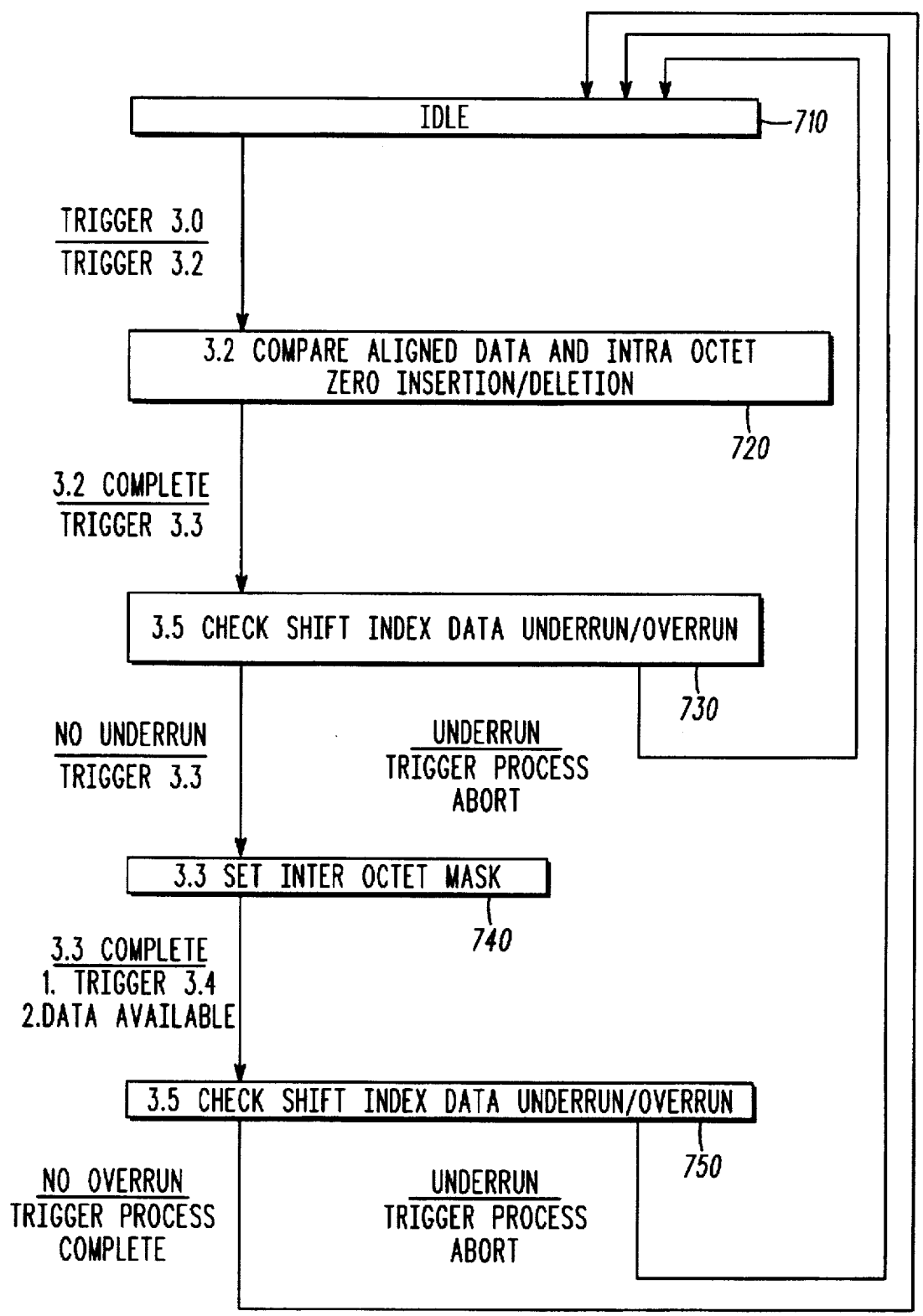
FIG. 7 is a state diagram for zero insertion and deletion within blocks of aligned data.

FIG. 7 is a state diagram for control of the zero insertion and deletion processes within blocks of aligned encoded data or raw data. From the idle state 710 (following completion of the aligned data interoctet zero insertion and deletion process shown in FIG. 6), the idle state 710 transitions to state 720 for performance of the zero insertion and deletion processes within blocks of data (intraoctet). Upon completion of this process, state 720 transitions to check the shift index for data underrun conditions, state 730. If a data underrun has occurred, the process abort is triggered and state 730 transitions to idle state 710. If no underrun has occurred, state 730 transitions to set the interoctet mask, state 740, for use on the next iteration. Upon completion of that process, the data is available for use. State 740 then triggers the next state 750, which checks the shift index for data overrun conditions. If an overrun has occurred, state 750 transitions to trigger a data overrun condition and return to idle state 710. If no overrun has occurred, the trigger process is complete.

FIGS. 12 and 13 provide additional detail concerning the HDLC flag detection and data alignment for the decoding method of the preferred embodiment of the present invention. Referring to FIG. 13, the preprocessor receives an input word or byte, state 1300. Upon such receipt, the preprocessor uses the reference bit sequences of TABLE A to determine if the input byte or word may be a flag, and determines an appropriate shift index, process 1310. If a beginning flag is present, conditional 1320 transitions to state 1330, for receipt of another input word. If a beginning flag is not present, conditional 1320 transitions to receive another input word, state 1300. From state 1330, the preprocessor shifts according to the shift index, to provide an aligned octet or word, state 1340. The aligned octet or word is then compared with a flag value, state 1350. If the aligned block of data is not an ending flag, conditional 1360 transitions to state 1370, to provide the aligned octet or word as the output to the subsequent decoding process. If the aligned octet is an ending flag, conditional 1360 transitions to state 1300, to receive another input word.

FIG. 12 provides additional detail concerning a hardware implementation for the flag detection and data alignment preprocessor of the preferred embodiment of the present invention. The input encoded data is stored in an input buffer 1200. The buffer data is compared with the reference bit values of TABLE A shown in block 1210, in the flag detector 1220. The flag detector 1220 and TABLE A 1210 also determine a shift value 1240 for input into shifter 1230, for determination of a bit shift necessary for an exact flag match. The aligned data output from the shifter 1230 is also input into flag detector 1250 for determination of an ending flag. The output from the ending flag detector provides aligned data 1260.

FIG. 8 is a flow diagram of the HDLC zero deletion decoding process of the present invention. The aligned octet or word from the preprocessor is received in state 800, and compared with the reference bit sequences of TABLE C (state 810), to determine whether there is a zero which potentially requires deletion (conditional 820) and, if so, whether zero deletion is required (conditional 830). If no zero is present which would require deletion, conditional 820 transitions to state 850. If a zero is present, but no deletion is required, conditional 830 also transitions to state 850. If a zero is present which requires deletion, conditional 830 transitions to delete the zero by shifting adjacent bits, in state 840, and transitions to state 850. In state 850, the aligned octet is further evaluated to determine whether an intraoctet zero deletion is required by comparison with the reference bit sequences of TABLE B. If a zero deletion is required, the output of state 850 will return a value with a zero deleted in the proper position if necessary and transition to conditional 860. Conditional 860 determines whether the returned value contain a zero deletion and, if so, transitions the state 870 to shift the aligned octet and update the shift index in state 870 and transitions to state 880. If no zero deletion was performed, conditional 860 transitions directly to state 880. In state 880, the possibly updated shift index is used to determine a new interoctet mask in TABLE C for use on the next iteration of incoming data, and transitions to state 890 which provides an output of a zero deleted (decoded) and aligned octet or word.

FIG. 9 is a flow diagram concerning the HDLC zero insertion process for encoding data of the present invention. A raw data octet or word is received and is compared to the reference bit sequences (interoctet mask) from TABLE E for interoctet insertion in state 910. Conditional 920 then determines whether zero insertion is required. If no insertion is required, conditional 920 transitions to state 940. If zero insertion is required, conditional 920 transitions to state 930 which inserts a zero in the proper bit position and shifts remaining bits into new bit positions. State 930 then transitions to state 940, which compares the aligned octet or word to the reference bit sequences contained in TABLE D, to determine whether an intraoctet zero insertion is required and, if so, a new value is returned from TABLE D and the process transitions to conditional 950. If a zero insertion was not performed, conditional 950 transitions to state 970. If a zero insertion was performed, the shift index is incremented in state 960, and transitions to state 970. In state 970, depending upon the new shift index value, a possibly new interoctet mask (reference bit sequences) is determined from TABLE E for use on the next iteration, and state 970 transitions to state 980 for output of a zero inserted (encoded) and aligned octet or word.

Figure 10A:
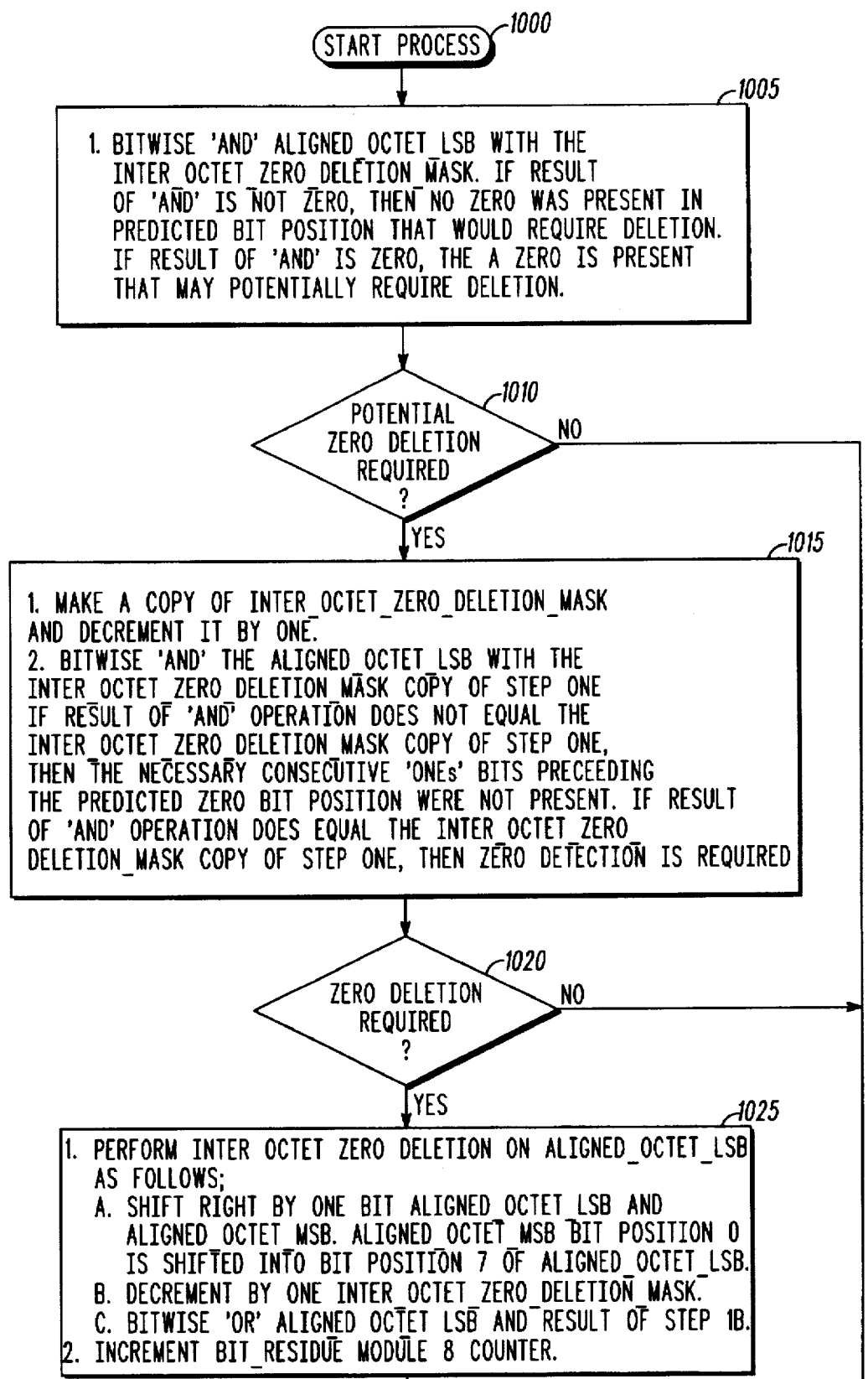
FIG. 10 is a flow diagram for the HDLC zero deletion decoding process in accordance with the preferred embodiment of the present invention.
Figure 10B:
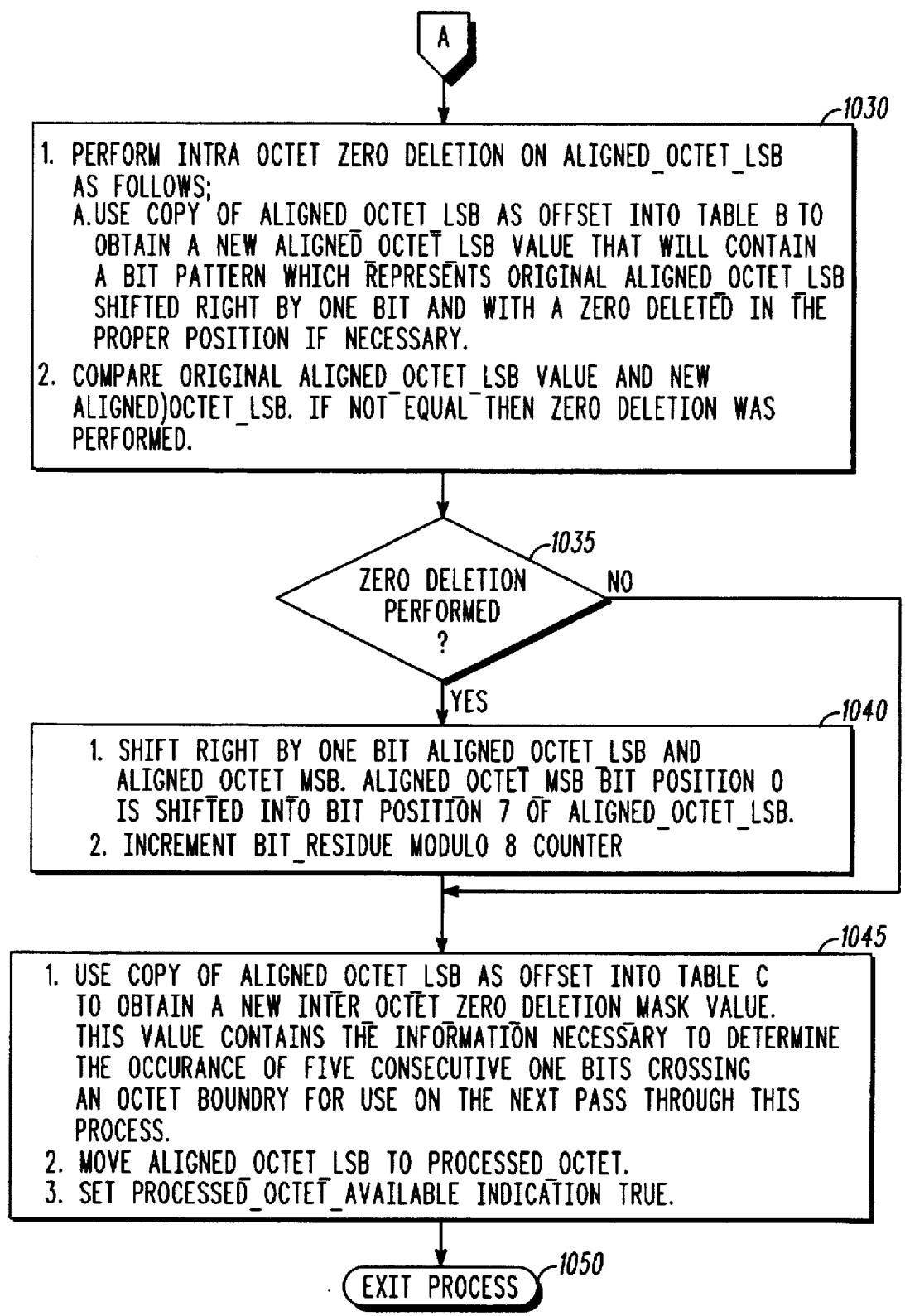

FIG. 10 provides additional detail concerning the HDLC zero deletion process of the preferred embodiment of the present invention, which is also shown as a hardware implementation in FIG. 2. Beginning with the start process 1000, the incoming octet transitions to state 1005, in which the aligned octet least significant byte ("LSB") (FIG. 15) is bitwise ANDED with the interoctet zero deletion mask (FIG. 2, block 210). If the result of the AND is not zero, then no zero was present in the predicted bit position that would require deletion. If the result of the AND is zero, then a zero is present that may potentially require deletion. From state 1005, conditional 1010 determines whether a potential zero deletion is required. If not, conditional 1010 transitions to state 1030. If yes, conditional 1010 transitions to state 1015. (FIG. 2, block 220).

In state 1015, a copy of the interoctet zero deletion mask is made and is decremented by one (FIG. 2, decrementer 230). The aligned octet LSB is bitwise ANDED with the interoctet zero deletion mask copy which has been decremented by one (FIG. 2, AND gate 240). If the result of the AND operation does not equal the interoctet zero deletion mask copy, then the necessary consecutive one bits preceding the predicted zero bit position were not present. If the result of the AND operation does equal the interoctet zero deletion mask copy which has been decremented by one, the zero deletion is required (FIG. 2, OR gate 250). State 1015 then transitions to conditional 1020, determining whether zero deletion is required. If no zero deletion is required, conditional 1020 transitions to state 1030. If zero deletion is required, conditional 1020 transitions to state 1025.

In state 1025, two processes are performed. First, an interoctet zero deletion is performed on the aligned octet LSB, as follows: (a) shift right by one bit the aligned octet LSB and the adjacent aligned octet most significant byte ("MSB") (FIG. 15), with the aligned octet MSB bit in position zero shifted into bit position 7 of aligned octet LSB; (b) decrement by one the interoctet zero deletion mask; and (c) bitwise OR the aligned octet LSB and the result of preceding step (b). Second, the bit residue modulo 8 counter is incremented. From state 1025, the process transitions to state 1030. (FIG. 2, block 220).

In state 1030, intraoctet zero deletion is performed on the aligned octet LSB as follows: (a) a copy of the aligned octet LSB is compared with the reference bit sequences of TABLE B to obtain a new aligned octet LSB value that will contain a bit pattern which represents the original aligned octet LSB shifted right by one bit and with a zero deleted in the proper position if necessary; and (b) state 1030 compares the original aligned octet LSB value and the new aligned octet LSB value, and if not equal, then a zero deletion was performed. State 1030 then transitions to conditional 1035 which ascertains whether a zero deletion was performed. If no zero deletion was performed, conditional 1035 transitions to state 1045. If a zero deletion was performed, conditional 1035 transitions to state 1040. (FIG. 2, block 260).

In state 1040, the aligned octet LSB and the aligned octet MSB are shifted right by one bit. The aligned octet MSB position zero is shifted into the bit position 7 of the aligned octet LSB. The bit residue modulo 8 counter is also incremented. (FIG. 2, block 270). State 1040 then transitions to state 1045 in which a copy of the aligned octet LSB, as offset, is compared with the reference bit sequences of TABLE C to obtain a new interoctet zero deletion mask value. This value contains the information necessary to determine the occurrence of five consecutive one bits crossing an octet boundary for use on the next pass (iteration) through the process. The aligned octet is then moved (or shifted) to a processed octet. The indicator for processed octet available is then set as true. State 1045 then transitions to exit process 1050.

As shown in the various state and flow diagrams herein, in the preferred embodiment of the present invention, a data underrun condition will abort (or idle) the decoding process. An underrun condition may occur when a sufficient number of zero deletions have occurred, causing all of the bits of the MSB to have been shifted into the LSB. This results in an absence of valid data in the MSB. Upon such an occurrence, the present invention idles (or aborts) until the next block of data has been shifted into the MSB, and the decoding process resumes.

Figure 11A:
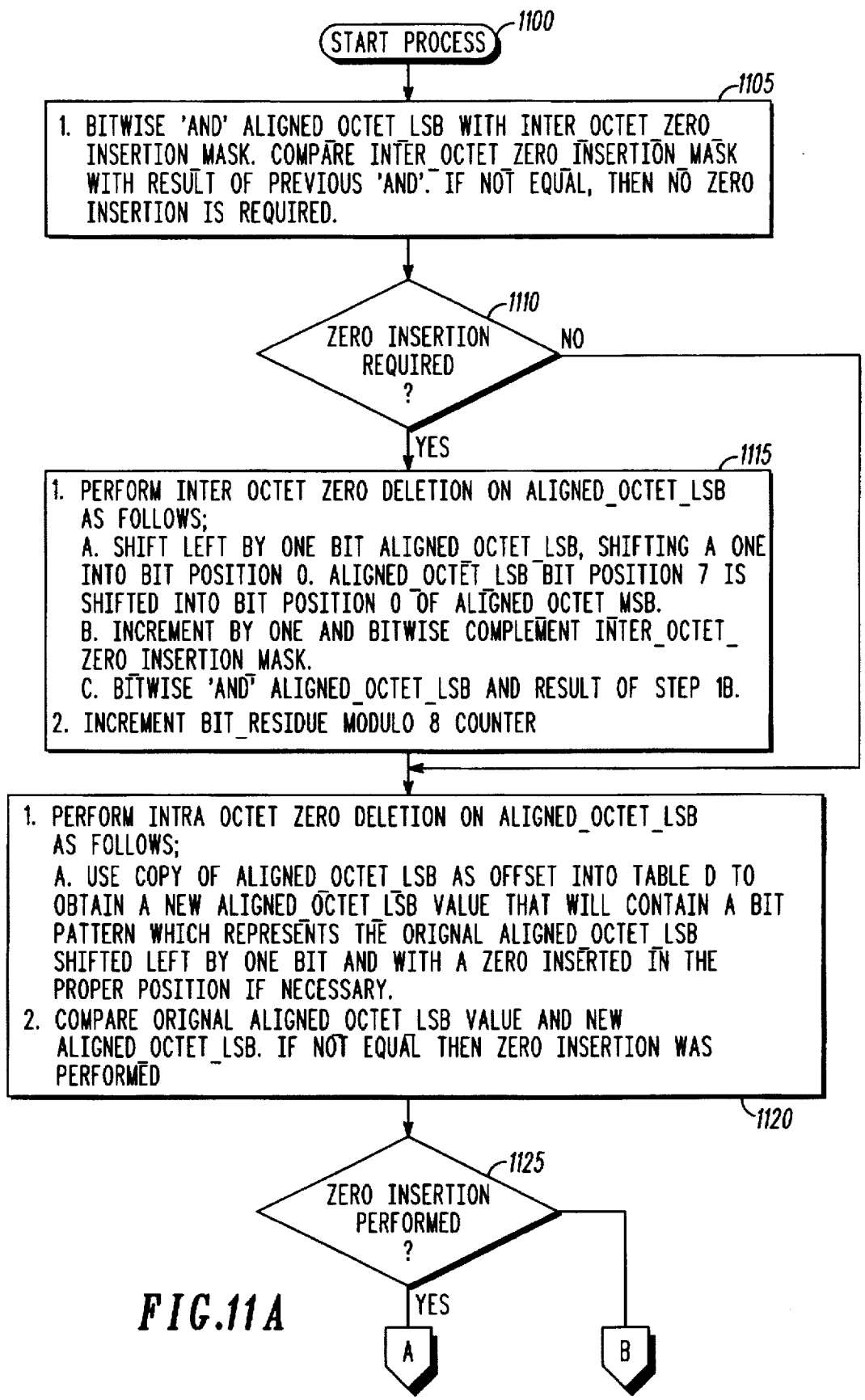
FIG. 11 is the flow diagram for the HDLC zero insertion encoding process in accordance with the preferred embodiment of the present invention.
Figure 11B:
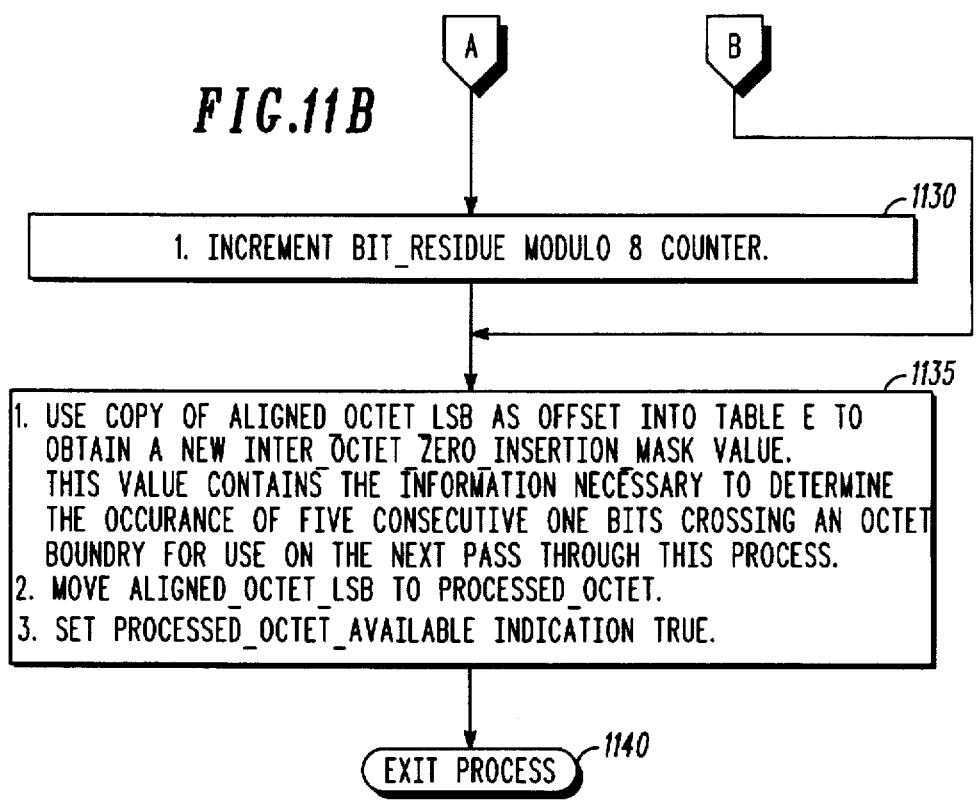

FIG. 11 is a flow diagram for the HDLC zero insertion process in the preferred embodiment of the present invention, which is also shown as a hardware block diagram in FIG. 3. Beginning with start process 1100, the aligned octet LSB is bitwise ANDED with the interoctet zero insertion mask (reference bit sequence) (TABLE E), as shown in state 1105. The interoctet zero insertion mask is compared with the result of this AND process. If they are not equal, then no zero insertion is required. From state 1105, the conditional 1110 determines whether a zero insertion is required. If no zero insertion is required, conditional 1110 transitions to the state 1120. If zero insertion is required, conditional 1110 transitions the state 1115. (FIG. 3, block 300).

In state 1115, interoctet zero insertion is performed on the aligned octet LSB as follows: (a) shift left by one bit the aligned octet LSB, shifting a one (1) into bit position zero, with the aligned octet LSB bit position 7 shifted into bit position zero of the aligned octet MSB; (b) increment by one and bitwise complement the interoctet zero insertion mask; (c) bitwise AND the aligned octet LSB with the result of step (b) above; and (d) increment the bit residue (shift index) modulo 8 counter. (FIG. 3, block 310).

From state 1115, the process transitions to state 1120, which performs the intraoctet zero insertion on the aligned octet as follows: (a) a copy of the aligned octet LSB, as offset, is compared with the reference bit sequences of TABLE D to obtain a new aligned octet LSB value that will contain a bit pattern which represents the original aligned octet LSB shifted left by one bit with a zero inserted in the proper position if necessary; (b) the original aligned octet LSB value and the new aligned octet LSB are compared and, if not equal, then a zero insertion was performed. State 1120 then transitions to conditional 1125, which determines whether a zero insertion was performed. If no zero insertion was performed, conditional 1125 transitions to state 1135. If a zero insertion was performed, conditional 1125 transitions to state 1130 which increments the bit residue (shift index) modulo 8 counter. (FIG. 3, block 320).

State 1130 and conditional 1125 then transition to state 1135, in which a copy of the aligned octet LSB, as offset, is compared with the reference bit sequences of TABLE E to obtain a new interoctet zero insertion mask value. This value contains the information necessary to determine the occurrences of five consecutive one bits crossing an octet boundary for use on the next pass through this process. The aligned octet LSB is then moved to the processed octet. The processed octet available indicator is then set as true, and state 1135 transitions to state 1140, exit process. (FIG. 3, block 330).

As shown in the various state and flow diagrams herein, in the preferred embodiment of the present invention, a data overrun condition will cause the encoding process to repeat (or iterate). An overrun condition may occur when a sufficient number of zero insertions have occurred, causing an excess number of bits in the MSB. This results in an excess of valid data in the MSB. Upon such an occurrence, the present invention repeats or iterates the encoding process until the excess block of data has been shifted into the LSB and encoded.

Figure 15:
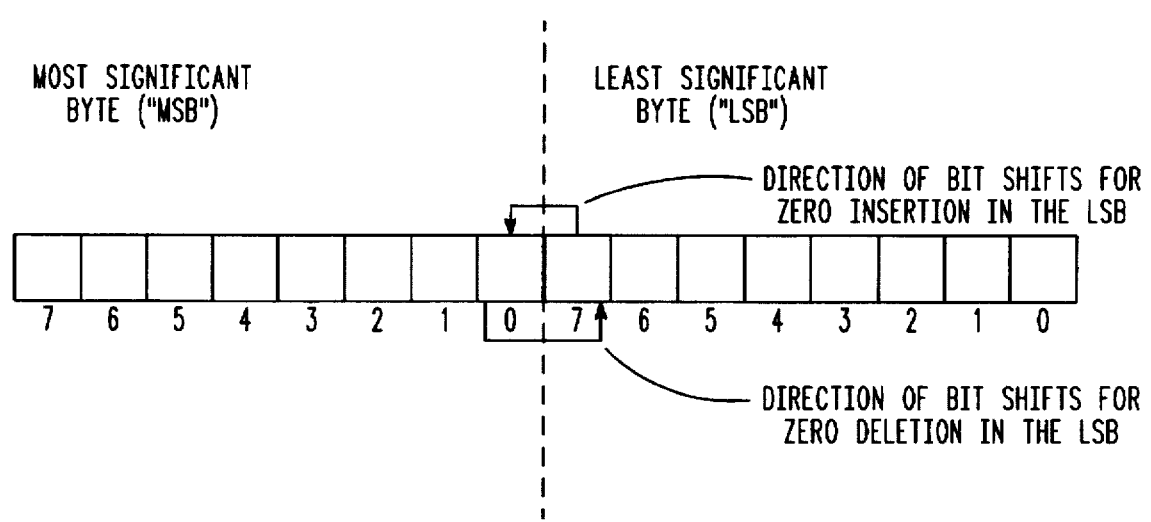
FIG. 15 is a block diagram showing adjacent bytes of data and data bit positions for bit shifting upon zero insertion or deletion in accordance with the present invention.

For convenience of reference, FIG. 15 is a diagram showing adjacent bytes of data, referred to herein as MSB and LSB, marked with bit positions 0 through 7, and further showing the direction of bit shifts upon insertion or deletion of a zero bit.

From the foregoing, it will be observed that numerous variations and modifications may be effected without departing from the spirit and scope of the novel concept of the invention. It is to be understood that no limitation with respect to the specific method illustated herein is intended or should be inferred. It is, of course, intended to cover by the appended claims all such modifications as fall within the scope of the claims.

TABLE A

HDLC-BISYNC DETECTION REFERENCE TABLE
Description: This table provides information about the received character. If it is the Bisync SYN char or the HDLC flag, status bits will be set to give the shift value HDLC/Bisync, valid/invalid, and ASCII/EBCDIC.

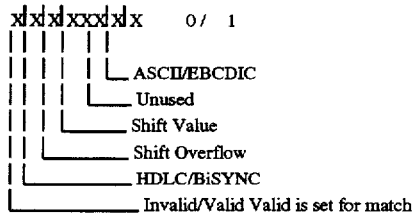

HDLC__BISYNC__DET__TABLE:

| Input Range | Return Values | | | | | | |
|---|---|---|---|---|---|---|---|
| 00-07 | 01CH | 000H | 000H | 000H | 000H | 000H | 000H |
| 08-0F | 000H | 000H | 000H | 000H | 05CH | 000H | 000H |
| 10-17 | 000H | 000H | 000H | 000H | 000H | 000H | 0C0H |
| 18-1F | 000H | 05DH | 000H | 000H | 000H | 000H | 000H |
| 20-27 | 051H | 000H | 000H | 051H | 000H | 000H | 000H |
| 28-2F | 000H | 000H | 000H | 000H | 044H | 044H | 000H |
| 30-37 | 000H | 000H | 0C1H | 000H | 000H | 000H | 000H |
| 38-3F | 000H | 000H | 000H | 000H | 000H | 000H | 000H |
| 40-47 | 055H | 000H | 000H | 000H | 000H | 000H | 055H |
| 48-4F | 000H | 000H | 000H | 000H | 000H | 000H | 000H |
| 50-57 | 000H | 000H | 000H | 000H | 000H | 000H | 000H |
| 58-5F | 048H | 000H | 000H | 048H | 000H | 000H | 000H |
| 60-67 | 050H | 000H | 000H | 000H | 045H | 045H | 000H |
| 68-6F | 000H | 000H | 000H | 000H | 000H | 000H | 000H |
| 70-77 | 000H | 000H | 000H | 000H | 000H | 000H | 000H |
| 78-7F | 000H | 000H | 000H | 000H | 000H | 080H | 01CH |
| 80-87 | 018H | 000H | 000H | 000H | 000H | 058H | 000H |
| 88-8F | 000H | 000H | 000H | 000H | 059H | 000H | 000H |
| 90-97 | 04DH | 04DH | 000H | 000H | 000H | 000H | 000H |
| 98-9F | 000H | 000H | 000H | 000H | 000H | 000H | 000H |
| A0-A7 | 000H | 000H | 000H | 000H | 000H | 000H | 000H |

000H
000H
000H
000H
000H
051H
000H
01CH
000H
000H
000H
055H
000H
050H
000H
01CH
000H
000H
04DH
018H
000H

TABLE A-continued

HDLC-BISYNC DETECTION REFERENCE TABLE

Description: This table provides information about the received character. If it is the Bisync SYN char or the HDLC flag, status bits will be set to give the shift value HDLC/Bisync, valid/invalid, and ASCII/EBCDIC.

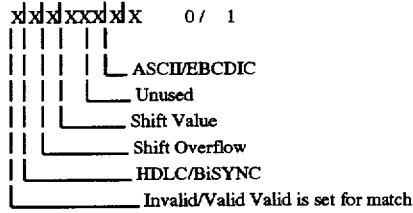

HDLC_BISYNC_DET_TABLE:

| Input Range | Return Values | | | | | | | |
|---|---|---|---|---|---|---|---|---|
| A8–AF | 000H | 000H | 000H | 000H | 000H | 000H | 000H | 000H |
| B0–B7 | 04CH | 000H | 000H | 000H | 000H | 000H | 000H | 04CH |
| B8–BF | 000H | 000H | 000H | 000H | 000H | 000H | 000H | 018H |
| C0–C7 | 014H | 000H | 054H | 000H | 000H | 000H | 000H | 000H |
| C8–CF | 049H | 000H | 000H | 049H | 000H | 000H | 000H | 014H |
| D0–D7 | 000H | 000H | 000H | 000H | 000H | 000H | 000H | 000H |
| D8–DF | 000H | 000H | 000H | 000H | 000H | 000H | 000H | 014H |
| E0–E7 | 010H | 000H | 000H | 000H | 000H | 000H | 000H | 010H |
| E8–EF | 000H | 000H | 000H | 000H | 000H | 000H | 000H | 010H |
| F0–F7 | 00CH | 000H | 000H | 00CH | 000H | 000H | 000H | 00CH |
| F8–FF | 008H | 008H | 000H | 008H | 004H | 004H | 000H | 000H |

(END OF TABLE A)

TABLE B

HDLC RIGHT SHIFT AND INTRAOCTET ZERO DELETION REFERENCE TABLE

Description: This table returns the right shift-zero deleted adjusted character. If value is the same as offset, no deletion was necessary.

HDLC_SHIFT_DEL_TABLE:

| Input Range | Return Values | | | | | | | |
|---|---|---|---|---|---|---|---|---|
| 00–07 | 000H | 001H | 002H | 003H | 004H | 005H | 006H | 007H |
| 08–0F | 008H | 009H | 00AH | 00BH | 00CH | 00DH | 00EH | 00FH |
| 10–17 | 010H | 011H | 012H | 013H | 014H | 015H | 016H | 017H |
| 18–1F | 018H | 019H | 01AH | 01BH | 01CH | 01DH | 01EH | 09FH |
| 20–27 | 020H | 021H | 022H | 023H | 024H | 025H | 026H | 027H |
| 28–2F | 028H | 029H | 02AH | 02BH | 02CH | 02DH | 02EH | 02FH |
| 30–37 | 030H | 031H | 032H | 033H | 034H | 035H | 036H | 037H |
| 38–3F | 038H | 039H | 03AH | 03BH | 03CH | 03DH | 0BEH | 0BFH |
| 40–47 | 040H | 041H | 042H | 043H | 044H | 045H | 046H | 047H |
| 48–4F | 048H | 049H | 04AH | 04BH | 04CH | 04DH | 04EH | 04FH |
| 50–57 | 050H | 051H | 052H | 053H | 054H | 055H | 056H | 057H |
| 58–5F | 058H | 059H | 05AH | 05BH | 05CH | 05DH | 05EH | 0BFH |
| 60–67 | 060H | 061H | 062H | 063H | 064H | 065H | 066H | 067H |
| 68–6F | 068H | 069H | 06AH | 06BH | 06CH | 06DH | 06EH | 06FH |
| 70–77 | 070H | 071H | 072H | 073H | 074H | 075H | 076H | 077H |
| 78–7F | 078H | 079H | 07AH | 07BH | 0FCH | 0FDH | 0FEH | 0FFH |
| 80–87 | 080H | 081H | 082H | 083H | 084H | 085H | 086H | 087H |
| 88–8F | 088H | 089H | 08AH | 08BH | 08CH | 08DH | 08EH | 08FH |
| 90–97 | 090H | 091H | 092H | 093H | 094H | 095H | 096H | 097H |
| 98–9F | 098H | 099H | 09AH | 09BH | 09CH | 09DH | 09EH | 0DFH |
| A0–A7 | 0A0H | 0A1H | 0A2H | 0A3H | 0A4H | 0A5H | 0A6H | 0A7H |
| A8–AF | 0A8H | 0A9H | 0AAH | 0ABH | 0ACH | 0ADH | 0AEH | 0AFH |
| B0–B7 | 0B0H | 0B1H | 0B2H | 0B3H | 0B4H | 0B5H | 0B6H | 0B7H |
| B8–BF | 0B8H | 0B9H | 0BAH | 0BBH | 0BCH | 0BDH | 0FEH | 0FFH |
| C0–C7 | 0C0H | 0C1H | 0C2H | 0C3H | 0C4H | 0C5H | 0C6H | 0C7H |
| C8–C | 0C8H | 0C9H | 0CAH | 0CBH | 0CCH | 0CDH | 0CEH | 0CFH |
| D0–D7 | 0D0H | 0D1H | 0D2H | 0D3H | 0D4H | 0D5H | 0D6H | 0D7H |
| D8–DF | 0D8H | 0D9H | 0DAH | 0DBH | 0DCH | 0DDH | 0DEH | 0FFH |
| E0–E7 | 0E0H | 0E1H | 0E2H | 0E3H | 0E4H | 0E5H | 0E6H | 0E7H |
| E8–EF | 0E8H | 0E9H | 0EAH | 0EBH | 0ECH | 0EDH | 0EEH | 0EFH |
| F0–F7 | 0F0H | 0F1H | 0F2H | 0F3H | 0F4H | 0F5H | 0F6H | 0F7H |
| F8–FF | 0F8H | 0F9H | 0FAH | 0FBH | 0FCH | 0FDH | 0FEH | 0FFH |

(END OF TABLE B)

TABLE C

HDLC INTEROCTET ZERO DELETION MASK REFERENCE TABLE
Description: This table returns the right shift-zero deleted boundary mask. If next value is the same initial, pattern as mask, delete zero, and shift.

HDLC_ZERO_DEL_TABLE:

| Input Range | Return Values | | | | | | | |
|---|---|---|---|---|---|---|---|---|
| 00–07 | 000H | 000H | 000H | 000H | 000H | 000H | 000H | 000H |
| 08–0F | 000H | 000H | 000H | 000H | 000H | 000H | 000H | 000H |
| 10–17 | 000H | 000H | 000H | 000H | 000H | 000H | 000H | 000H |
| 18–1F | 000H | 00DH | 000H | 000H | 000H | 000H | 000H | 000H |
| 20–27 | 000H | 000H | 000H | 000H | 000H | 000H | 000H | 000H |
| 28–2F | 000H | 000H | 000H | 000H | 000H | 000H | 000H | 000H |
| 30–37 | 000H | 000H | 000H | 000H | 000H | 000H | 000H | 000H |
| 38–3F | 000H | 000H | 000H | 000H | 000H | 000H | 000H | 000H |
| 40–47 | 000H | 000H | 000H | 000H | 000H | 000H | 000H | 000H |
| 48–4F | 000H | 000H | 000H | 000H | 000H | 000H | 000H | 000H |
| 50–57 | 000H | 000H | 000H | 000H | 000H | 000H | 000H | 000H |
| 58–5F | 000H | 000H | 000H | 000H | 000H | 000H | 000H | 000H |
| 60–67 | 000H | 000H | 000H | 000H | 000H | 000H | 000H | 000H |
| 68–6F | 000H | 000H | 000H | 000H | 000H | 000H | 000H | 000H |
| 70–77 | 000H | 000H | 000H | 000H | 000H | 000H | 000H | 000H |
| 78–7F | 000H | 000H | 000H | 000H | 000H | 000H | 000H | 000H |
| 80–87 | 010H | 010H | 010H | 010H | 010H | 010H | 010H | 010H |
| 88–8F | 010H | 010H | 010H | 010H | 010H | 010H | 010H | 010H |
| 90–97 | 010H | 010H | 010H | 010H | 010H | 010H | 010H | 010H |
| 98–9F | 010H | 010H | 010H | 010H | 010H | 010H | 010H | 010H |
| A0–A7 | 010H | 010H | 010H | 010H | 010H | 010H | 010H | 010H |
| A8–AF | 010H | 010H | 010H | 010H | 010H | 010H | 010H | 010H |
| B0–B7 | 010H | 010H | 010H | 010H | 010H | 010H | 010H | 010H |
| B8–BF | 010H | 010H | 010H | 010H | 010H | 010H | 010H | 010H |
| C0–C7 | 008H | 008H | 008H | 008H | 008H | 008H | 008H | 008H |
| C8–CF | 008H | 008H | 008H | 008H | 008H | 008H | 008H | 008H |
| D0–D7 | 008H | 008H | 008H | 00BH | 008H | 008H | 008H | 008H |
| D8–DF | 008H | 008H | 008H | 008H | 00SH | 008H | 008H | 008H |
| E0–E7 | 004H | 004H | 004H | 004H | 004H | 004H | 004H | 004H |
| E8–EF | 004H | 004H | 004H | 004H | 004H | 004H | 004H | 004H |
| F0–F7 | 002H | 002H | 002H | 002H | 002H | 002H | 002H | 002H |
| F8–FF | 001H | 001H | 001H | 001H | 000H | 000H | 000H | 000H |

(END OF TABLE C)

TABLE D

HDLC LEFT SHIFT AND INTRAOCTET ZERO INSERTION REFERENCE TABLE
Description: This table returns the left shift-zero inserted adjusted character. If value is the same as offset, no insertion was necessary.

HDLC_SHIFT_INS_TABLE:

| Input Range | Return Values | | | | | | | |
|---|---|---|---|---|---|---|---|---|
| 00–07 | 000H | 001H | 002H | 003H | 004H | 005H | 006H | 007H |
| 08–0F | 008H | 009H | 00AH | 00BH | 00CH | 00DH | 00EH | 00FH |
| 10–17 | 010H | 011H | 012H | 013H | 014H | 015H | 016H | 017H |
| 18–1F | 018H | 019H | 01AH | 01BH | 01CH | 01DH | 01EH | 0E0H |
| 20–27 | 020H | 021H | 022H | 023H | 024H | 025H | 026H | 027H |
| 28–2F | 028H | 029H | 02AH | 02BH | 02CH | 02DH | 02EH | 02FH |
| 30–37 | 030H | 031H | 032H | 033H | 034H | 035H | 036H | 037H |
| 38–3F | 038H | 039H | 03AH | 03BH | 03CH | 03DH | 0C1H | 0A0H |
| 40–47 | 040H | 041H | 042H | 043H | 044H | 045H | 046H | 047H |
| 48–4F | 048H | 049H | 04AH | 04BH | 04CH | 04DH | 04EH | 04FH |
| 50–57 | 050H | 051H | 052H | 053H | 054H | 055H | 056H | 057H |
| 58–5F | 058H | 059H | 05AH | 05BH | 05CH | 05DH | 05EH | 060H |
| 60–67 | 060H | 061H | 062H | 063H | 064H | 065H | 066H | 067H |
| 68–6F | 068H | 069H | 06AH | 06BH | 06CH | 06DH | 06EH | 06FH |
| 70–77 | 070H | 071H | 072H | 073H | 074H | 075H | 076H | 077H |
| 78–7F | 078H | 079H | 07AH | 07BH | 083H | 082H | 041H | 020H |
| 80–87 | 080H | 081H | 082H | 083H | 084H | 085H | 086H | 087H |
| 88–8F | 088H | 089H | 08AH | 08BH | 08CH | 08DH | 08EH | 08FH |
| 90–97 | 090H | 091H | 092H | 093H | 094H | 095H | 096H | 097H |
| 98–9F | 098H | 099H | 09AH | 09BH | 09CH | 09DH | 09EH | 0E0H |
| A0–A7 | 0A0H | 0A1H | 0A2H | 0A3H | 0A4H | 0A5H | 0A6H | 0A7H |
| A8–AF | 0A8H | 0A9H | 0AAH | 0ABH | 0ACH | 0ADH | 0AEH | 0AFH |
| B0–B7 | 0B0H | 0B1H | 0B2H | 0B3H | 0B4H | 0B5H | 0B6H | 0B7H |
| B8–BF | 0B8H | 0B9H | 0BAH | 0BBH | 0BCH | 0BDH | 0C1H | 0A0H |
| C0–C7 | 0C0H | 0C1H | 0C2H | 0C3H | 0C4H | 0C5H | 0C6H | 0C7H |
| C8–CF | 0C8H | 0C9H | 0CAH | 0CBH | 0CCH | 0CDH | 0CEH | 0CFH |
| D0–D7 | 0D0H | 0D1H | 0D2H | 0D3H | 0D4H | 0D5H | 0D6H | 0D7H |
| D8–DF | 0D8H | 0D9H | 0DAH | 0DBH | 0DCH | 0DDH | 0DEH | 060H |
| E0–E7 | 0E0H | 0E1H | 0E2H | 0E3H | 0E4H | 0E5H | 0E6H | 0E7H |
| E8–EF | 0E8H | 0E9H | 0EAH | 0EBH | 0ECH | 0EDH | 0EEH | 0EFH |
| F0–F7 | 0F0H | 0F1H | 0F2H | 0F3H | 0F4H | 0F5H | 0F6H | 0F7H |
| F8–FF | 0F8H | 0F9H | 0FAH | 0FBH | 083H | 082H | 041H | 020H |

(END OF TABLE D)

TABLE E

HDLC INTEROCTET ZERO INSERTION REFERENCE TABLE
Description: This table returns the left shift-zero inserted boundary mask. If next value is the same initial, pattern as mask, insert zero, and shift.

HDLC_ZERO_INS_TABLE:
Input
Range                           Return Values

| Input Range | | | | | | | | |
|---|---|---|---|---|---|---|---|---|
| 00–07 | 0FFH | 0FFH | 0FFH | 0FFH | 0FFH | 0FFH | 0FFH | 0FFH |
| 08–0F | 0FFH | 0FFH | 0FFH | 0FFH | 0FFH | 0FFH | 0FFH | 0FFH |
| 10–17 | 0FFH | 0FFH | 0FFH | 0FFH | 0FFH | 0FFH | 0FFH | 0FFH |
| 18–1F | 0FFH | 0FFH | 0FFH | 0FFH | 0FFH | 0FFH | 0FFH | 0FFH |
| 20–27 | 0FFH | 0FFH | 0FFH | 0FFH | 0FFH | 0FFH | 0FFH | 0FFH |
| 28–2F | 0FFH | 0FFH | 0FFH | 0FFH | 0FFH | 0FFH | 0FFH | 0FFH |
| 30–37 | 0FFH | 0FFH | 0FFH | 0FFH | 0FFH | 0FFH | 0FFH | 0FFH |
| 38–3F | 0FFH | 0FFH | 0FFH | 0FFH | 0FFH | 0FFH | 0FFH | 0FFH |
| 40–47 | 0FFH | 0FFH | 0FFH | 0FFH | 0FFH | 0FFH | 0FFH | 0FFH |
| 48–4F | 0FFH | 0FFH | 0FFH | 0FFH | 0FFH | 0FFH | 0FFH | 0FFH |
| 50–57 | 0FFH | 0FFH | 0FFH | 0FFH | 0FFH | 0FFH | 0FFH | 0FFH |
| 58–5F | 0FFH | 0FFH | 0FFH | 0FFH | 0FFH | 0FFH | 0FFH | 0FFH |
| 60–67 | 0FFH | 0FFH | 0FFH | 0FFH | 0FFH | 0FFH | 0FFH | 0FFH |
| 68–6F | 0FFH | 0FFH | 0FFH | 0FFH | 0FFH | 0FFH | 0FFH | 0FFH |
| 70–77 | 0FFH | 0FFH | 0FFH | 0FFH | 0FFH | 0FFH | 0FFH | 0FFH |
| 78–7F | 0FFH | 0FFH | 0FFH | 0FFH | 0FFH | 0FFH | 0FFH | 0FFH |
| 80–87 | 00FH | 00FH | 00FH | 00FH | 00FH | 00FH | 00FH | 00FH |
| 88–8F | 00FH | 00FH | 00FH | 00FH | 00FH | 00FH | 00FH | 00FH |
| 90–97 | 00FH | 00FH | 00FH | 00FH | 00FH | 00FH | 00FH | 00FH |
| 98–9F | 00FH | 00FH | 00FH | 00FH | 00FH | 00FH | 00FH | 00FH |
| A0–A7 | 00FH | 00FH | 00FH | 00FH | 00FH | 00FH | 00FH | 00FH |
| A8–AF | 00FH | 00FH | 00FH | 00FH | 00FH | 00FH | 00FH | 00FH |
| B0–B7 | 00FH | 00FH | 00FH | 00FH | 00FH | 00FH | 00FH | 00FH |
| B8–BF | 00FH | 00FH | 00FH | 00FH | 00FH | 00FH | 00FH | 00FH |
| C0–C7 | 007H | 007H | 007H | 007H | 007H | 007H | 007H | 007H |
| C8–CF | 007H | 007H | 007H | 007H | 007H | 007H | 007H | 007H |
| D0–D7 | 007H | 007H | 007H | 007H | 007H | 007H | 007H | 007H |
| D8–DF | 007H | 007H | 007H | 007H | 007H | 007H | 007H | 007H |
| E0–E7 | 003H | 003H | 003H | 003H | 003H | 003H | 003H | 003H |
| E8–EF | 003H | 003H | 003H | 003H | 003H | 003H | 003H | 003H |
| F0–F7 | 001H | 001H | 001H | 001H | 001H | 001H | 001H | 001H |
| F8–FF | 000H | 000H | 000H | 000H | 0FFH | 0FFH | 0FFH | 0FFH |

(END OF TABLE E)

We claim:

1. A method of decoding a data stream, said data stream having a frame, said frame having a first predetermined bit sequence at its beginning, said frame having a second predetermined bit sequence at its end, said frame further having encoded data between said first and second predetermined bit sequences, said method comprising:

(a) locating said first predetermined bit sequence;

(b) aligning said encoded data into a plurality of aligned encoded blocks based on said location of said first predetermined bit sequence;

(c) performing a first comparison of at least one of said aligned encoded blocks with a plurality of reference bit sequences based on adjacent aligned encoded blocks; and (d) performing a second comparison of said at least one aligned encoded block with a second plurality of reference bit sequences based on a singular aligned encoded block; and (e) providing a decoded block as a result of said first and second comparisons; and (f) repeating steps (b), (c), (d) and (e) until said second predetermined bit sequence is located.

2. The method of claim 1 wherein said frame is HDLC protocol encoded.

3. The method of claim 2 wherein said decoded block is a zero deleted block.

4. The method of claim 1 wherein said frame is SDLC protocol encoded.

5. The method of claim 1, wherein steps (c) and (d) further comprise:
   detecting an inserted zero bit in said at least one aligned encoded block; and
step (e) further comprises:
   upon said detection of an inserted zero bit, deleting said inserted zero bit to form a zero deleted block.

6. The method of claim 5 further comprising shifting at least one bit from an adjacent aligned encoded block into said zero deleted block to form a decoded block.

7. The method of claim 5, further comprising maintaining alignment of encoded blocks following said zero deletion.

8. The method of claim 5 wherein a shift index is modified as a result of said zero deletion.

9. The method of claim 1, further comprising:
   (g) detecting a data underrun.

10. The method of claim 9, further comprising:
    (h) idling until another aligned encoded block is shifted for decoding.

11. The method of claim 1, wherein step (a) further comprises:
    (a1) forming a plurality of blocks from said data stream;
    (a2) comparing at least one of said blocks with a plurality of flag reference bit sequences which indicate a possible occurrence of said first predetermined bit sequence; and
    (a3) detecting said first predetermined bit sequence as a result of said comparison.

12. The method of claim 1 wherein step (b) further comprises:
    setting a shift index as a result of said location of said first predetermined bit sequence.

13. A method of decoding a stream of HDLC protocol encoded data, said stream having a frame, said frame having a first predetermined bit sequence at its beginning, said frame having a second predetermined bit sequence at its end, said frame further having encoded data between said first and second predetermined bit sequences, said method comprising:

(a) forming said stream of HDLC protocol encoded data into a plurality of blocks;

(b) locating said first predetermined bit sequence by performing a first comparison of at least one of said blocks with a plurality of reference bit sequences which indicate a possible occurrence of said first predetermined bit sequence, and detecting said first predetermined bit sequence as a result of said first comparison;

(c) aligning said encoded data into a plurality of aligned encoded blocks, based on said location of said first predetermined bit sequence, by setting a shift index;

(d) detecting a possible occurrence of an inserted zero bit in at least one of said aligned encoded blocks by
   a second comparison of said aligned encoded block with a plurality of reference bit sequences to determine said possible occurrence of an inserted zero bit, said second comparison based on adjacent aligned encoded blocks of data, and
   a third comparison of said aligned encoded block with a second plurality of reference bit sequences to determine said possible occurrence of an inserted zero bit, said third comparison based on a singular aligned encoded block;

(e) upon detection of said inserted zero bit, deleting said occurring inserted zero bit to form a zero deleted block and shifting at least one bit from an adjacent aligned encoded block into said zero deleted block;

(f) providing a decoded block of data;

(g) maintaining alignment of aligned encoded blocks following said zero deletion by modifying said shift index as a result of said zero deletion;

(h) detecting the occurrence of a data underrun, and upon said detection of a data underrun, idling until another encoded block of data is shifted for decoding; and (i) repeating steps (c) through (h) until said second predetermined bit sequence is located.

14. A method of decoding a plurality of aligned encoded blocks of data, the method comprising:

performing a first comparison of each aligned encoded block of data with a first plurality of reference bit sequences to detect the presence of an inserted zero bit in the aligned encoded block of data, the first comparison based on adjacent aligned encoded blocks of data;

performing a second comparison of each aligned encoded block of data with a second plurality of reference bit sequences to detect the presence of an inserted zero bit in the aligned encoded block of data, the second comparison based on a singular aligned encoded block of data; and decoding each of the aligned encoded blocks of data based on the first and second comparisons.

* * * * *